United States Patent [19]

Jacquier et al.

[11] Patent Number: 5,239,564
[45] Date of Patent: Aug. 24, 1993

[54] PROCESS FOR DISMANTLING AN IRRADIATED COMPONENT OF A NUCLEAR REACTOR BY THE CUTTING OF ITS WALL

[75] Inventors: Paul Jacquier, Tassin-la-Demi-Lune; Jean-Paul Guigon, Givry, both of France

[73] Assignee: Framatome, Courbevoie, France

[21] Appl. No.: 721,699

[22] Filed: Jun. 26, 1991

[30] Foreign Application Priority Data

Jun. 27, 1990 [FR] France .................. 90 08117
Nov. 7, 1990 [FR] France .................. 90 13816

[51] Int. Cl.⁵ .......................................... G21F 9/28
[52] U.S. Cl. ................................ 376/260; 83/930; 29/426.4
[58] Field of Search ............. 376/260, 249, 308; 976/DIG. 391, DIG. 394, DIG. 395; 83/923, 930; 29/723, 906, 426.3, 426.4, 426.5

[56] References Cited

U.S. PATENT DOCUMENTS

| | | | |
|---|---|---|---|
| 3,755,079 | 8/1973 | Weinstein et al. | 376/293 |
| 4,813,313 | 3/1989 | Ichikawa et al. | 376/260 |
| 4,818,472 | 4/1989 | Operschall et al. | 376/260 |
| 5,001,870 | 3/1991 | Yokota et al. | 29/426.3 |

FOREIGN PATENT DOCUMENTS 2554256 6/1977 Fed. Rep. of Germany .

OTHER PUBLICATIONS

Patent Abstract of Japan—vol. 14—No. 191, 2-36399, Feb. 1990.
Patent Abstract of Japan—vol. 13—No. 475, 1-187499, Jul. 1989.
Patent Abstract of Japan—vol. 13—No. 324, 1-92696, Apr. 1989.

*Primary Examiner*—Daniel D. Wasil
*Attorney, Agent, or Firm*—Pollock, Vande Sande & Priddy

[57] ABSTRACT

The irradiated component (1) comprises at least one tubular wall with its axis vertical and fastened inside a well (2) in a concrete structure (3). The connecting elements between the concrete structure (3) and the component (1) are destroyed, the component (1) is displaced in successive steps in the vertical direction along its axis on the inside of the well (2), and the wall of the component is cut, so as to obtain blocks (26) of irradiated material of the wall, at the upper level of the well (2) of the concrete structure (3) after each displacement of the component (1). The cut blocks (26) are disposed of for the purpose of elimination or storage. The displacement of the component can be obtained by a pull or push on its lower bottom.

11 Claims, 19 Drawing Sheets

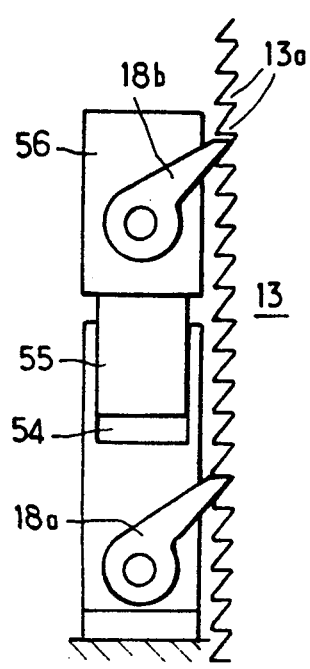 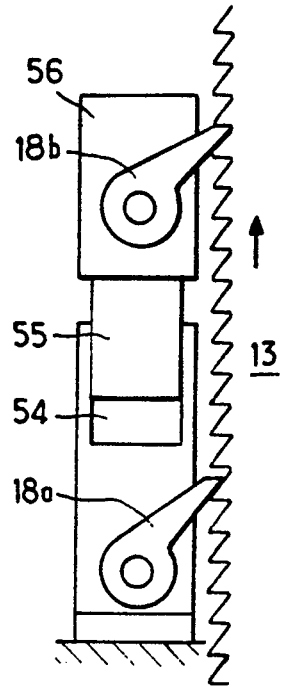 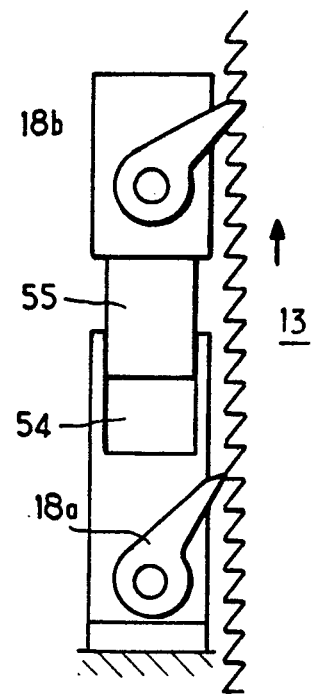
FIG.8A  FIG.8B  FIG.8C
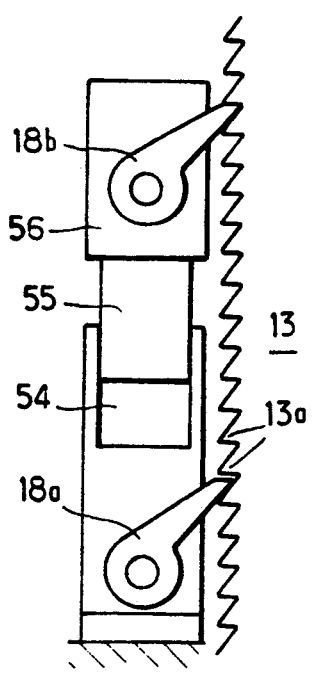 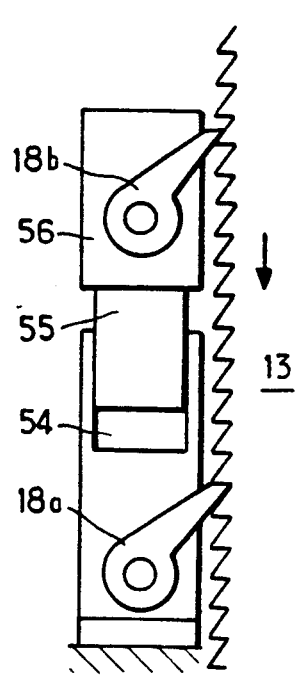 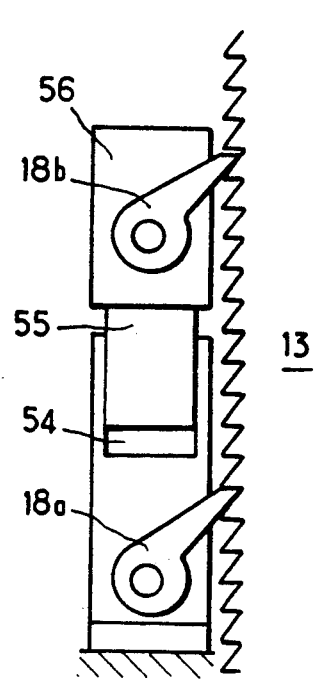
FIG.8D  FIG.8E  FIG.8F

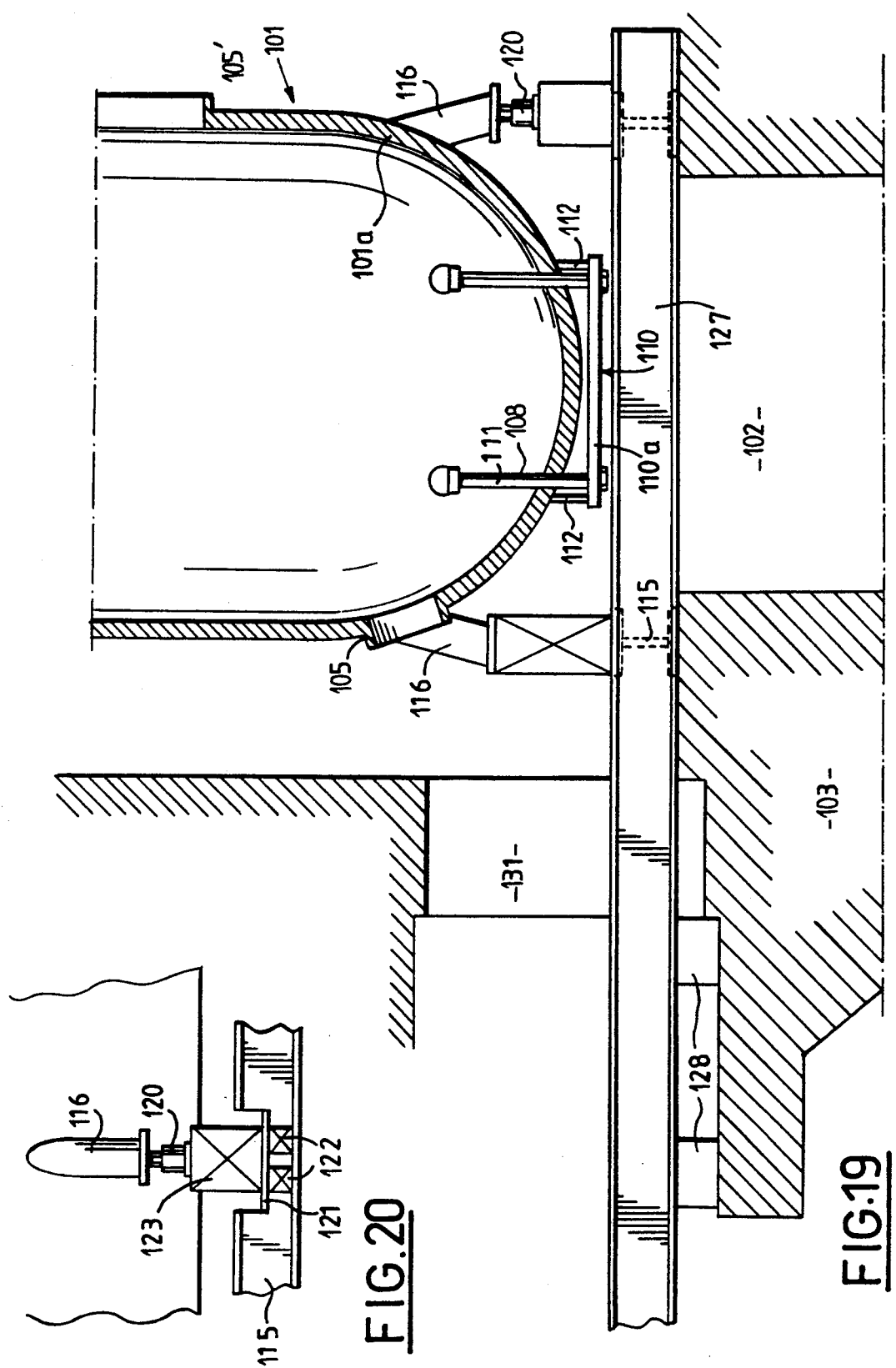

PROCESS FOR DISMANTLING AN IRRADIATED COMPONENT OF A NUCLEAR REACTOR BY THE CUTTING OF ITS WALL

FIELD OF THE INVENTION the invention relates to a process and an apparatus for dismantling an irradiated component of a nuclear reactor, particularly a vessel of a nuclear reactor cooled by pressurized water.

BACKGROUND OF THE INVENTION

Water-cooled nuclear reactors, particularly pressurized-water nuclear reactors, comprise a vessel which is intended for containing the core of the nuclear reactor and which is connected to the reactor cooling circuit in which the cooling water circulates.

The wall of the reactor vessel which is in contact with the cooling fluid and which is exposed to the radiation emitted by the reactor core can be activated and contaminated after the reactor has been in operation for some time.

In the case of nuclear power stations which have reached the end of their life and require a complete shutdown, the solution adopted in the past has been to leave these power stations in their existing state and to allow the activity of the constituent materials of their components to decrease, in order subsequently to dismantle them under more satisfactory conditions than at the time of the shutdown, without the need to employ complex, remotely controlled equipment.

The number of power stations put out of industrial operation will increase appreciably in the future, and it is therefore necessary to consider dismantling these power stations in order to restore the site where they are installed to its original state.

The dismantling of the conventional part of the power station presents no particular problem, but, in contrast, the dismantling of the part of the power station constituting the actual nuclear reactor poses problems which are difficult to solve in view of the radioactive emissions of the constituent materials of the reactor components.

In particular, the vessel of water-cooled nuclear reactors, which contains the fuel assemblies and which is in contact with the cooling water of the reactor during its operation, is activated and contaminated where reactors which have reached the end of their life are concerned.

As regards pressurized-water nuclear reactors in operation at the present time, the reactor vessel takes the form of a body of generally cylindrical shape closed by domed bottoms, of large size and having a considerable wall thickness.

The vessel, which has a very high mass, is arranged within a vessel well made in a concrete structure which also delimits one or more pools located above the upper level of the vessel.

The vessel which contains not only the fuel assemblies but also various internal structures, is connected by means of connection pieces to pipelines of the primary circuit of the reactor.

The core assemblies and some components of the internal structures can be dismantled and removed from the vessel, in order to ensure their disposal and, if appropriate, their elimination at the time when the reactor is put out of operation.

Some components of the highly-activated internal structures of the reactor, such as the shroud of the core, may need to be kept inside the vessel so as to be cut under water (radiological protection). Their dismantling has to be carried out within the vessel and during the operations of dismantling the vessel itself.

To date, no process and apparatus is known which enables the vessel of a pressurized-water nuclear reactor to be dismantled under without the risk of radioactive contamination in the work zone, while at same time using machining and handling means of relatively simple design in order to carry out the fragmentary disposal and elimination of the material of the vessel.

SUMMARY OF THE INVENTION

The object of the invention is, therefore, to provide a process for dismantling an irradiated component of a nuclear reactor, comprising at least one wall of tubular shape arranged with its axis in the vertical direction and fastened inside a well made in a concrete structure, this process making it possible under very good safety conditions and in a simple way to carry out the fragmentation of the wall of the component and the disposal and elimination of the fragments obtained.

To achieve this object:

the connecting elements between the concrete structure and the component are destroyed, the component is displaced some distance in the vertical direction along its axis on the inside of the well and in successive steps, the wall of the component is cut over a height corresponding substantially to the vertical displacement distance, so as to obtain blocks of the irradiated material of the wall, at the upper level of the well of the concrete structure after each displacement of the component, the cut blocks are disposed of for the purpose of effecting their elimination or storage, and the cutting of the component is carried out in successive steps separated by a vertical displacement.

Advantageously, and in order to increase the safety of the process, to carry out the displacement of the component in the vertical direction in successive steps:

first means for raising the component are placed under a lower part of the component and so as to bear on a stationary support resting on the concrete structure of the reactor, in the vicinity of the bottom of the vessel well, the component is lifted by a push of the first raising means on the lower part of the component, a first modular supporting element is introduced between the lower part of the component and the stationary support on which the modular element comes to bear, the first raising means are actuated oppositely to the lifting direction, in order to bring the lower part of the component to bear on the first modular element, and for each of the subsequent successive displacement steps of the component:

a unit lift of the component over a specific vertical distance is executed by second raising means bearing one the support and in engagement with a modular supporting element interposed between the component and the stationary support and resting on the stationary support before the unit lift of the component, a modular supporting element, the height of which is smaller than the vertical distance of unit lift of the component, is introduced between the modular element with which the second raising means interact and the stationary support, and the second raising means are actuated oppositely to the lifting direction, in order to bring the component to bear on the support by means of the superposed modular elements.

BRIEF DESCRIPTION OF THE DRAWINGS

To facilitate comprehension of the invention, several embodiments of the dismantling process according to the invention will now be described by way of example with regard to the dismantling of a vessel of a pressurized-water nuclear reactor.

FIGS. 8A to 8F are schematic views of the means for displacing the vessel in the vertical direction during various successive steps of the displacement of the vessel in the vertical direction and upwards.

FIGS. 18 to 26 relate to the dismantling of a nuclear-reactor vessel by a process employing a lifting of the vessel in successive steps by a push on its lower part.

FIG. 18 is a sectional elevation view of a vessel of a water-cooled nuclear reactor, in place in the structure of the reactor, before its dismantling.

FIG. 19 is a partially sectional elevation view of the lower part of the vessel illustrated in FIG. 18, during an initial lifting phase employing first lifting means.

FIG. 20 is an elevation view of a means for lifting the vessel

FIG. 21 is a top plan view of the stationary support of the vessel which takes the form of a ring.

FIG. 22 is a partially sectional elevation view of the lower part of the vessel after the installation of second lifting means and of a first modular supporting element.

FIG. 23 is a side elevation view in the direction of arrow 23 of FIG. 22.

FIG. 24 is a partially sectional top plan view of the second lifting means and of the first modular supporting element in place on the stationary support of the vessel.

FIG. 25 is a sectional view in a vertical plane of the structure of the reactor and of the vessel during one of the initial dismantling phases.

FIG. 26 is a sectional view in a vertical plane of the structure of the reactor and of the vessel during one of the final dismantling phases.

DESCRIPTION OF PREFERRED EMBODIMENT

Figure 1:
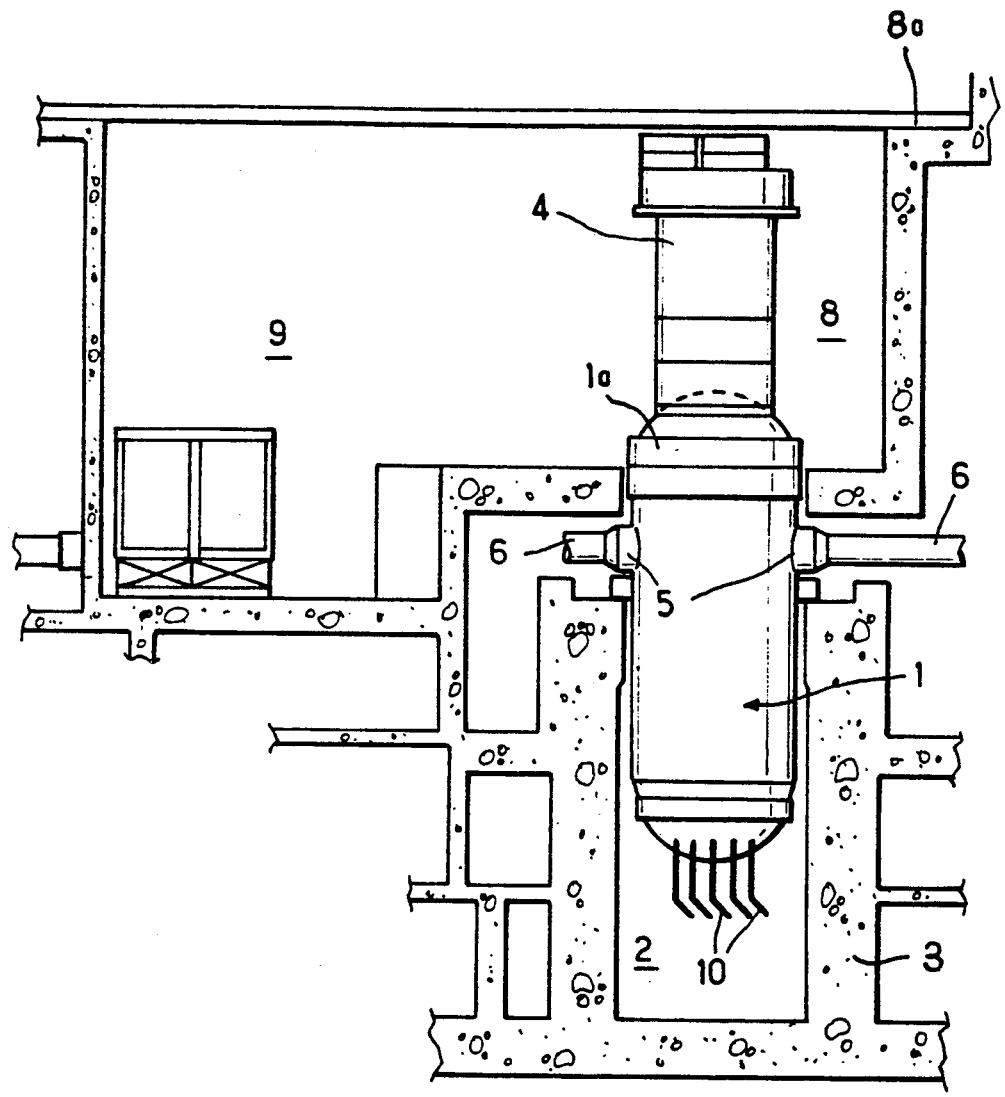
FIG. 1 is a view in vertical section of a vessel of a pressurized-water nuclear reactor and of its concrete supporting structure.

FIG. 1 shows the vessel 1 of a pressurized-water nuclear reactor, mounted inside a vessel well 2 made within a concrete structure 3 constituting part of the reactor building of the nuclear power station.

The vessel 1, which is of generally cylindrical shape, is arranged in the vessel well 2 with its axis vertical, and has its lower part closed by a domed bottom and its upper part by a cover 1a, likewise of domed shape.

Above the cover 1a of the vessel is arranged the set 4 of mechanisms for controlling the bars adjusting the reactivity of the core of the reactor, which consists of juxtaposed fuel assemblies placed inside the vessel 1.

The vessel 1 is connected by means of connection pieces 5 to the pipelines 6 of the various loops of the primary circuit of the reactor, in which circulates the pressurized water coming into contact with the core assemblies within the vessel 1 and ensuring the heating and evaporation of feed water inside the steam generators of the power station.

The concrete structure 3 forms, above the vessel well 2, a pool 8 which can be filled with water up to the vicinity of its upper level 8a, to make it possible to execute handling and maintenance operations on the inside of the vessel of the nuclear reactor during the reactor shutdowns and after removal of the control set 4 and of the cover 1a of the vessel.

The pool 8 comprises a part 9 which is placed laterally of the actual reactor pool located vertically in line with the vessel and in which the internal equipment of the reactor vessel can be arranged in order to carry out underwater maintenance or repair operations.

The bottom of the vessel 1 has passing through it instrumentation conduits 10 which are connected to an instrumentation room located laterally of the vessel well 2.

Figure 2:
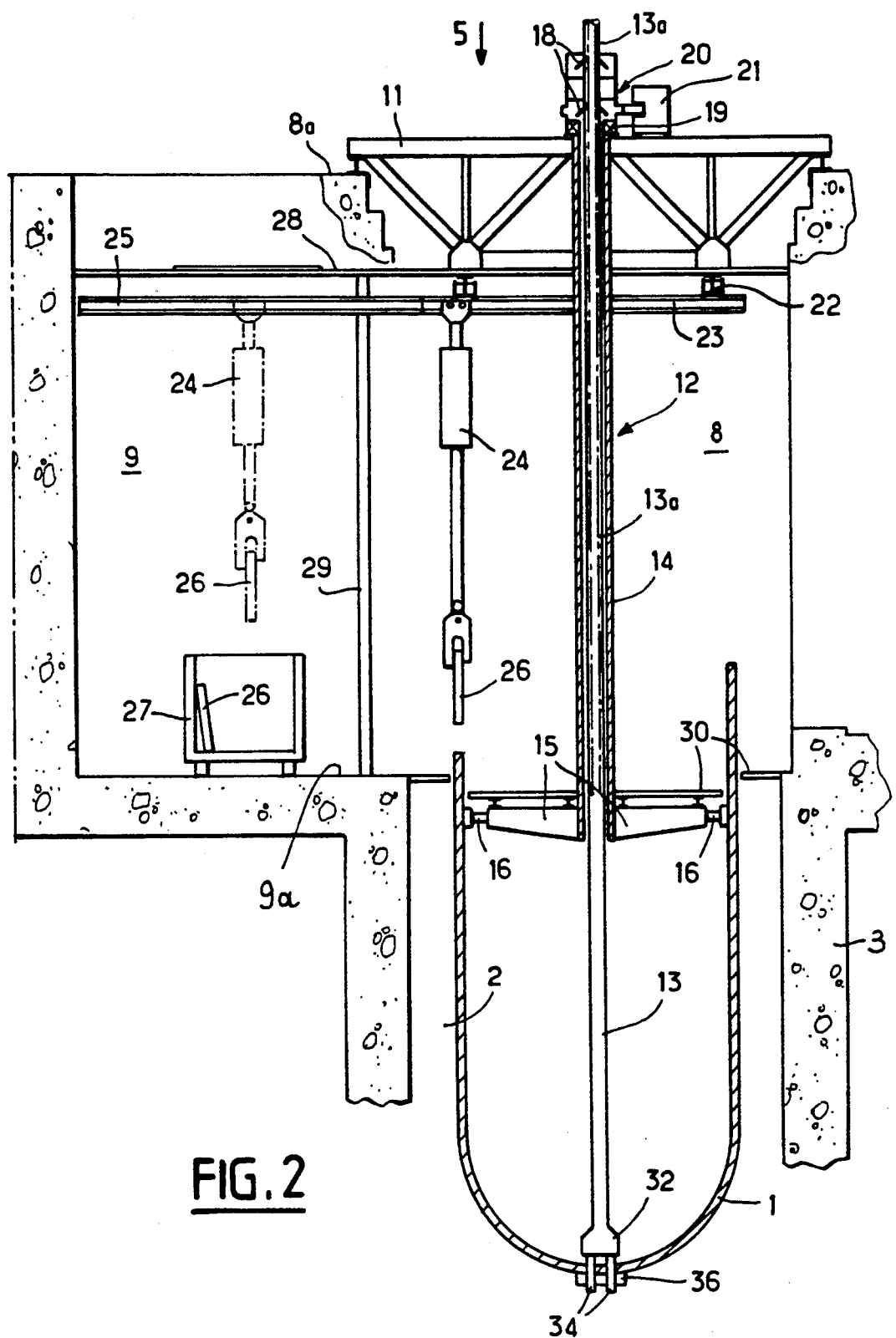
FIG. 2 is a schematic sectional view in a vertical plane of the means of displacement of a nuclear-reactor vessel during dismantling by the process according to the invention, and of the means for disposing of the blocks cut from the wall of the vessel.

FIG. 2 illustrates the vessel 1 of a pressurized-water nuclear reactor during a dismantling operation executed by the use of the process according to the invention.

The process according to the invention is put into practice after a permanent shutdown of the nuclear reactor and after unloading of the core assemblies and of the internal equipment of the nuclear reactor.

After the shutdown and cooling of the nuclear reactor, the pool 8 is filled with water and the vessel cover is removed.

The unloading of the core assemblies and the dismounting and disposal of the internal equipment of the vessel are then carried out under water.

The fuel assemblies can be placed in containers to ensure their transport and disposal towards a reprocessing factory.

The generally highly-irradiated internal equipment can be stored temporarily, before being dismantled under water and disposed of in transport containers.

It is also possible at least partially to carry out the underwater dismantling of the internal equipment of the vessel on the inside of the latter.

After the unloading of the vessel, the disposal of the internal equipment and the emptying of the pool, there is installed above the upper level 8a of the reactor pool a supporting structure 11 which consists of beams and on which rests the upper part of a lifting device 12, comprising particularly a mast of great length 13 which is arranged vertically along the axis of the vessel 1 and whose lower part is connected to the bottom of the vessel 1.

The mast 13 is arranged within a tubular structure 14 placed vertically along the axis of the vessel 1 and having its upper part connected to the supporting structure 11. Arms 15 for centering and retaining the device 12 on the inside of the vessel, each having a jack 16 at its end, are fastened to the lower part of the tubular structure 14 and are arranged in the form of a star around this tubular structure. The jacks 16, which come to bear with their end part on the inner surface of the vessel 1, make it possible to carry out the centering and retention of the vessel 1 in relation to the tubular structure 14 and to the mast 13.

The mast 13 comprises a toothing 13a over a substantial part of its length, the toothing 13a interacting with pawls 18 of a vessel-lifting mechanism 20 resting on the supporting structure 11 by means of a rotary thrust bearing 19.

The rotating part of the bearing 19 can be driven in rotation about the vertical axis common to the vessel well 2 and to the vessel 1 by means of a motor 21.

Figure 5:
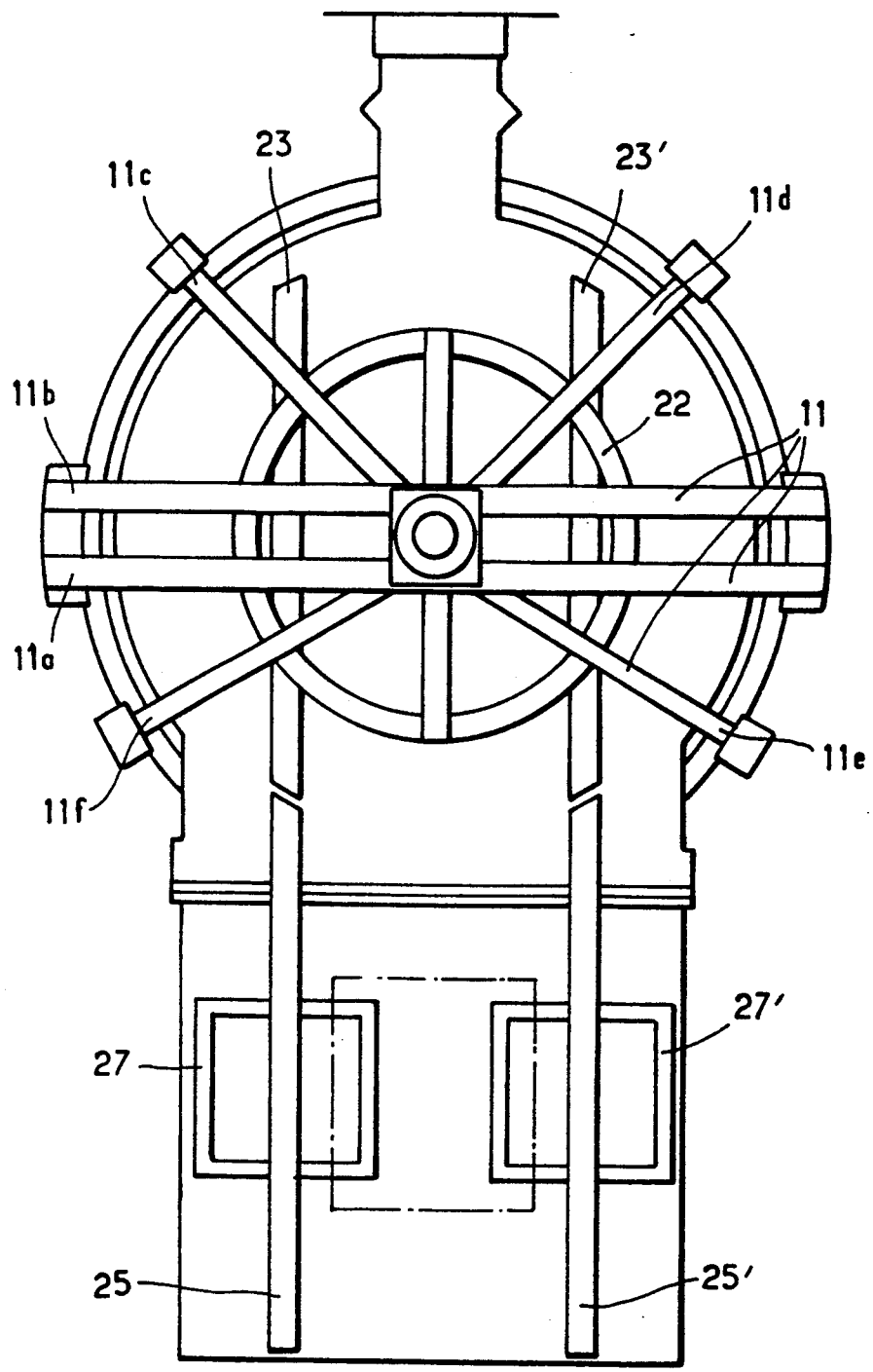
FIG. 5 is a top plan view in the direction of arrow 5 of FIG. 2 of the supporting and handling means used for dismantling the vessel.

The lower part of supporting structure 11 carries a circular rail 22 on which are mounted movably in terms of rotation about the axis of the vessel well, by means of carriages, two monorails 23 and 23', shown in FIG. 5, allowing the displacement of hoists 24 in the entire zone located above the upper edge of the vessel 1 and in the storage pool 9 for the internal equipment as a result of the presence of fixed rails 25 and 25', in the extension of which the rotationally movable rails 23 and 23' can be placed.

As will be explained later, the cutting of blocks 26 of irradiated material from the wall of the vessel is carried out substantially level with the bottom 9a of the pool 9 for the internal equipment, i.e., at the upper level of the vessel well.

When a block 26 has been cut from the wall of the vessel 1, a hoist 24 can ensure that this block is picked up in any position and the block 26 transported into the pool 9 for the internal equipment, in which is arranged a container 27 for the storage and transport of the blocks 26 of irradiated material. The hoist 24 makes it possible to transport the blocks 26 between their cutting zone and their storage zone within the container 27.

Zone containment walls 28 are placed at the upper level of the pool, below the supporting structure 11, in order to isolate the zone in which the cutting of the blocks 26 is carried out during the dismantling of the vessel 1, from the zone located above the pool, from which the control of the various operations put into effect for the dismantling is executed.

Likewise, walls 29 make it possible to separate the pool for storing the internal equipment of the reactor from the zone 8 located vertically in line with the vessel, although passages are provided for the hoists 24 for transporting the blocks 26.

Finally, the inner volume of the vessel 1 is isolated from the reactor pool 8 by means of walls 30, in order to limit the radiation in the zone located above the vessel well 2.

Figure 3:
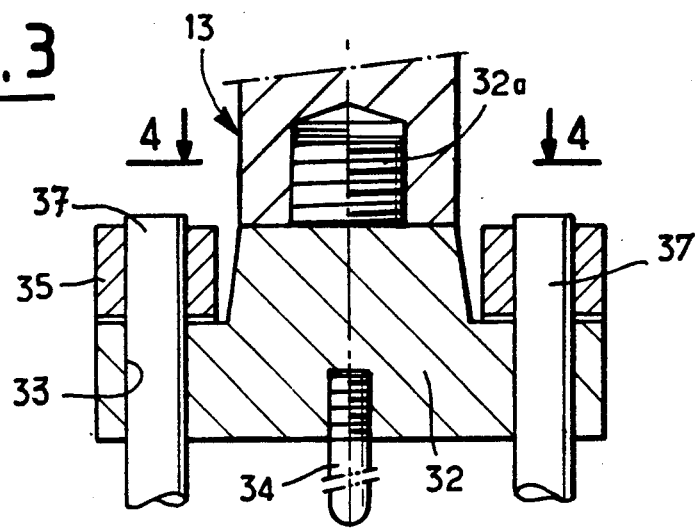
FIG. 3 is a sectional view in a vertical plane and in elevation of the means for fastening the bottom of the vessel to the end of a mast for displacement in the vertical direction.
Figure 4:
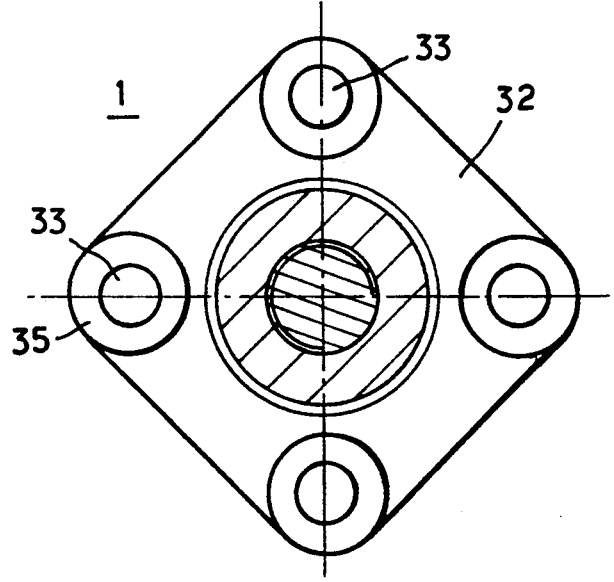
FIG. 4 is a top plan view of the means for fastening the vessel, in the direction of arrows 4 of FIG. 3.

FIGS. 3 and 4 illustrate the lower part of the mast 13 of the lifting device 12 for the vessel 1.

This lower part consists of a platen 32 which can be fastened to the lower part of the mast 13 in its axial direction by means of a threaded part 32a engaged in an internally-threaded hole at the end of the mast 13.

The platen 32 comprises four orifices 33 and a centering stud 34 intended for ensuring the fastening and positioning of the end of the mast 13 on the bottom of the vessel 1.

After unloading of the vessel, the connection pieces joining this vessel to the primary circuit and all the auxiliary pipework as well as the instrumentation tubes 10 of the vessel bottom are severed and then closed off.

Four passage holes through the vessel bottom are machined or remachined in arrangements corresponding to the arrangements of the passage holes 33 of the platen 32 of the mast 13.

It is also possible to fasten the vessel to the mast 13 by the use of a number of passage holes through the vessel bottom and a number larger than four of ties fastened in these holes, so as to employ ties and to machine holes of smaller diameter.

The mast 13 can be installed by introducing the centering stud 34 into an instrumentation passage hole and by bringing the holes 33 into coincidence with the orifices of the vessel bottom which have been machined or remachined. All the passage orifices of the instrumentation tubes, with the exception of the orifices which have been remachined as appropriate, are closed off, and the fastening of the mast 13 is ensured by means of threaded rods 37 fastened to the platen 32 by nuts 35.

A fastening plate 36 (see FIG. 2) having orifices in positions corresponding to the orifices 33 of the platen 32 is placed under the vessel bottom in such a way that the threaded rods 37 engage into the orifices of this fastening plate 36.

The fastening of the mast 13 is completed by nuts engaged on the rods 37 and coming to bear with a clamping effect against the lower face of the plate 36.

The vessel 1 is thus firmly fixed at the end of the mast 13 which is mounted movably in the vertical direction along the axis of the tubular structure 14 and on the inside of this structure.

Devices for wedging in the radial directions are also interposed between the tubular structure 14 and the mast 13, so as to ensure the guidance and retention of the mast 13 during its displacements in the vertical direction. Inflatable gaskets are likewise interposed between the mast 13 and the structure 14, so as to ensure the isolation or containment of the inner volume of the vessel 1 during the dismantling operations.

Finally, as mentioned above, the vessel is retained by the arms 15 and jacks 16 in a position such that its axis is aligned with the axis of the mast 13 and of the tubular structure 14.

As can be seen in FIG. 5, the supporting structure 11 comprises two parallel main beams 11a and 11b and four lateral beams 11c, 11d, 11e and 11f arranged in the form of a star around the axis of the vessel well of the reactor.

The ends of the beams 11a to 11f rest on the concrete structure of the reactor, for example on the bearing surfaces of the anti-missile slab arranged vertically in line with the vessel well and at the upper level 8a of the reactor pool.

Figure 6:
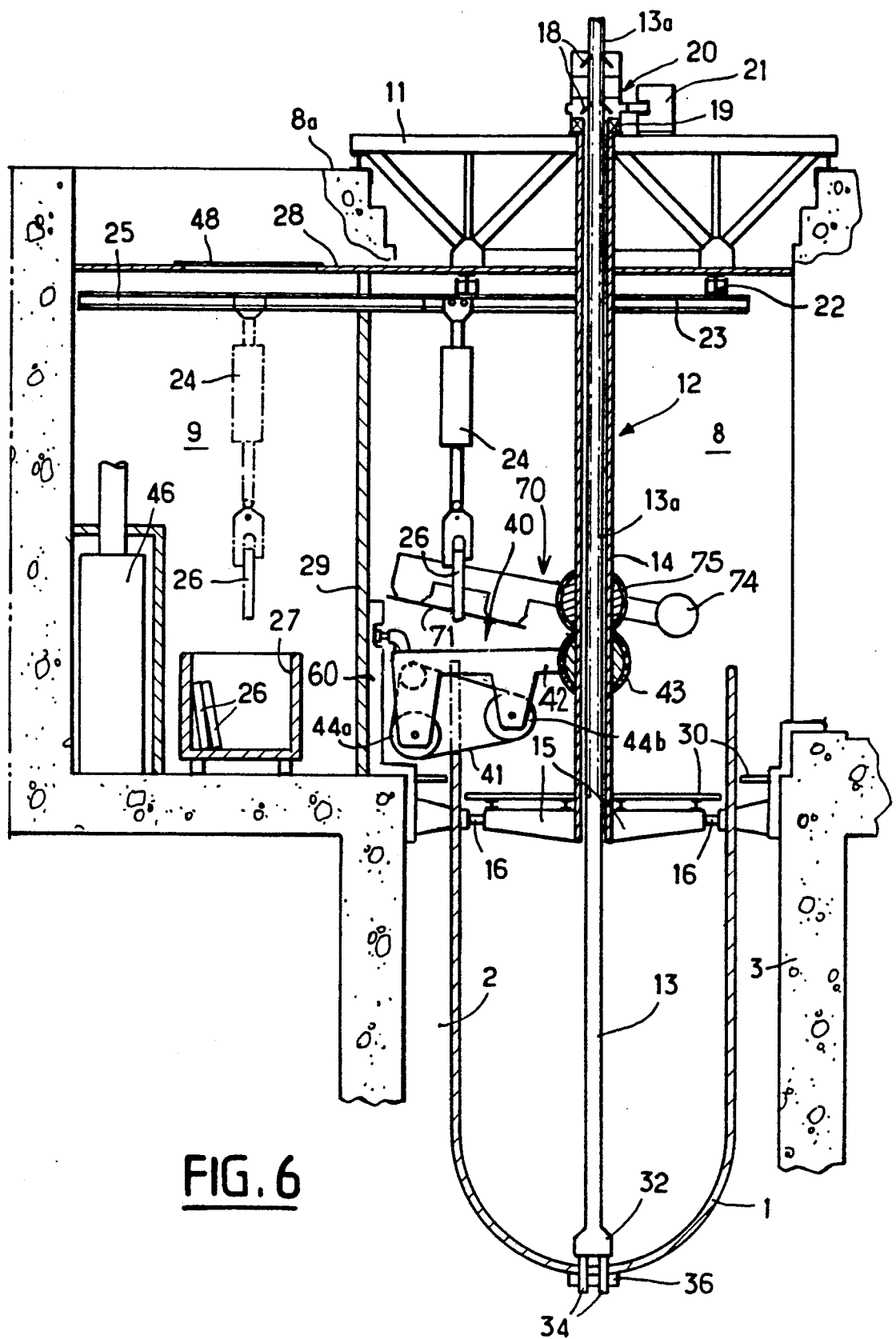
FIG. 6 is a sectional view in a vertical plane and in elevation of the whole of the means for handling and cutting a vessel during dismantling by the process according to the invention.

FIG. 6 illustrates the entire apparatus for dismantling the vessel during an operation for cutting the wall of the vessel.

The corresponding elements in FIGS. 2 and 6 bear the same references, the apparatus, as illustrated in FIG. 6, comprising, in addition to the means for lifting the vessel and for handling the cut blocks 26, a horizontal cutting unit 40 and a vertical cutting unit 70 which are mounted on the tubular structure 14.

The horizontal cutting unit 40 consists of a band saw 41 mounted on a support 42 fastened to the tubular structure 14 by means of a pivot bearing 43. The saw support 42 can be displaced, for the purpose of executing the cutting of the wall of the vessel, in the way which will be described in detail hereinbelow.

The vertical cutting unit 70 consisting of a second band saw 71 makes it possible to separate the segment of the vessel wall cut by the saw of substantially horizontal displacement into blocks of irradiated materials 26, which are transported by the hoists 24 into the storage pool 9 for the internal equipment and deposited in a storage and disposal container 27.

The cutting of the wall of the vessel over a particular height is carried out after the vessel 1 has been raised some distance in the vertical direction by means of the mast 13 and the lifting unit 20. The lifting unit 20 consists of a pawl device which will be described below.

An appliance 46 for the suction and filtration of the gases in the storage pool 9 for the internal equipment is arranged, in an isolated zone of this pool, in order to clear away the gases contaminated by radioactive materials present in the dismantling zone and in the storage zone for the irradiated material.

An access orifice making it possible to dispose of the container 27 containing the blocks of irradiated material is provided in the biological containment wall 28, this orifice being closed during the dismantling operations by a slab 48 of radiation-absorbing material.

Figure 7:
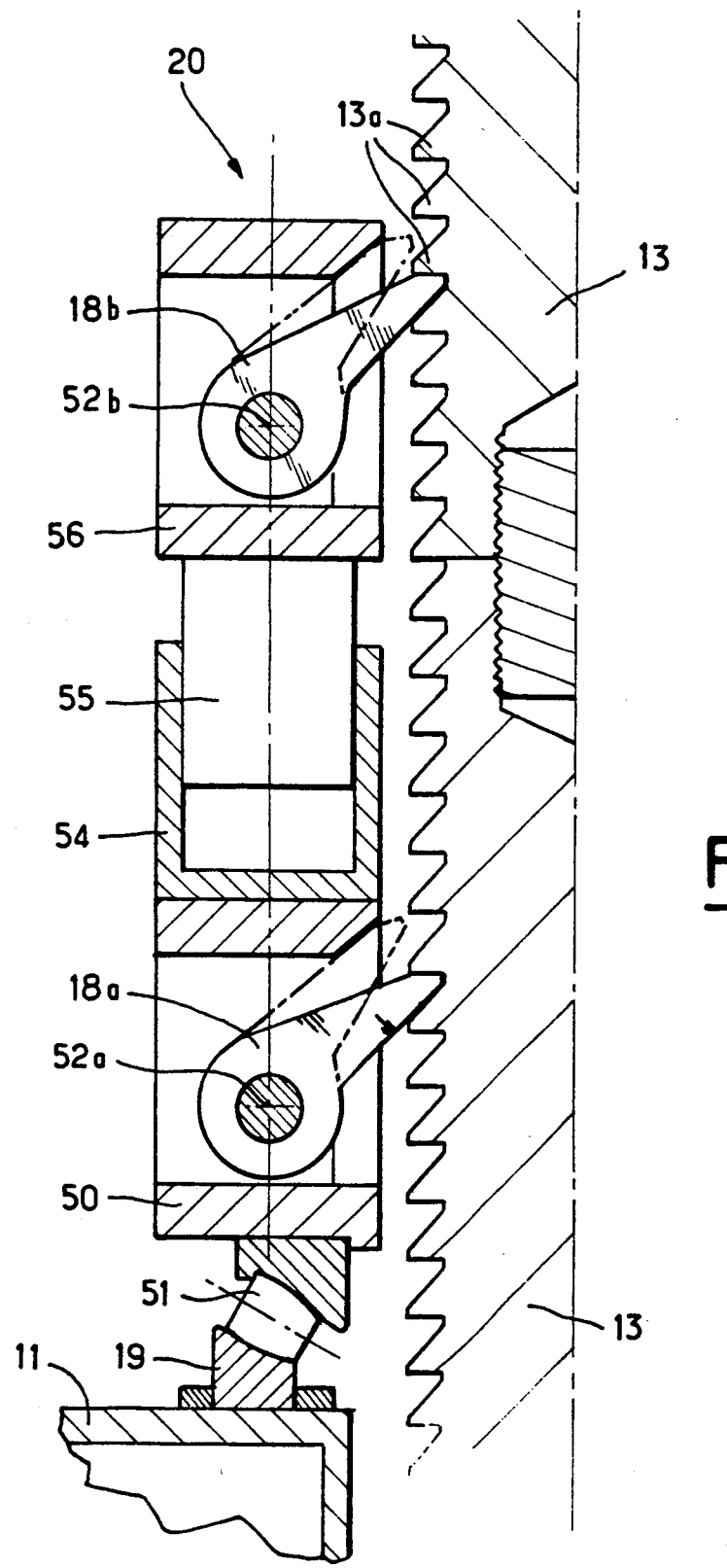
FIG. 7 is a sectional view in a vertical plane of the upper part of the means for supporting the vessel and displacing it in the vertical direction during dismantling.

As can be seen in FIG. 7, the pawl-type lifting device 20 comprises a support 50 resting on the supporting structure 11 by means of the pivoting bearing 19, the axis of which is the axis of the mast 13 coinciding with the axis of the vessel well 2 and the axis of the vessel 1.

The bearing 19 is a roller bearing, the rollers 51 of which are inclined inwards and downwards so as to ensure perfect alignment of the axis of the mast 13 with the axis of the vessel well.

The support 50 of the lifting device 20 has an annular shape and carries four fixed pawls, such as the pawl 18a, arranged at 90° relative to one another about the axis of the mast 13, and mounted pivotably on the support 50 about horizontal axes, such as the axis 52a.

The upper part of the support 50 constitutes a jack body 54 which is level with each of the fixed pawls 18a and in which is mounted a jack rod 55 of large cross-section, carrying at its upper end a support 56 in which a movable pawl 18b is mounted pivotably about a horizontal axis 52b.

The pawls 18a and 18b comprise a profiled end part, the shape of which corresponds to the shape of the space delimited between two successive teeth of the toothing 13a of the mast 13.

The pawls 18a and 18b are capable of pivoting through a particular angle of low amplitude between their position shown in solid lines in FIG. 7 and their position shown in broken lines.

In the position shown in solid lines, the pawls are in engagement with the toothing 13a of the mast 13, and in their position is shown in broken lines, they are in a position disengaged from the toothing 13a.

FIGS. 8A to 8F show schematically the pawls 18a and 18b, the mast 13 and the actuating jack 54 of the movable pawls 18b in successive positions during a displacement phase in the vertical direction and towards the top of the mast 13, to the lower part of which the vessel 1 is fastened.

In FIG. 8A, the mast 13 bears on the fixed pawl 18a in its engagement position within the toothing 13a.

The jack rod 55 is in the low position.

To execute the lifting of the mast 13 and of the vessel 1, the chamber of the jack 54 is fed in such a way as to displace the piston 55 and the support 56 upwards, as shown in FIG. 8B. The bearing pawl 18a, which has a ramp corresponding to the slope of the toothing 13a, comes into the disengaged position as a result of the sliding of its ramp on the toothing. The mast 13 rests on the movable pawl 18b which ensures that it is lifted by means of the jack 54.

During the lifting of the mast 13, as shown in FIGS. 8C and 8D, the fixed pawl 18a disengages completely from the toothing as a result of an upward pivoting, and then escapes at the tip of the tooth with which it was in contact, when the tip of the tooth comes level with the end of the pawl 18a. The pawl 18a is then released and falls by pivoting back into the space located below the tip of the tooth, its inclined surface coming into contact with the slope of the toothing 13a.

As illustrated in FIG. 8E, the double-action jack 54 is fed in such a way as to cause the descent of the rod 55 and of the movable pawl 18b which disengages from the toothing 13a, the mast 13 coming to rest on the fixed pawl 18a.

As can be seen in FIG. 8F, the pawl 18b comes into position again in a space between two teeth located below the space in which this pawl 18b was engaged before the displacement of the mast 13, as shown in FIG. 8A.

The pawls 18a and 18b are in identical positions in FIGS. 8A and 8F, the mast 13 having been displaced by one pitch of the rack 13a.

The displacement of the jack 55 is equal to the pitch of the rack plus some play necessary for bringing about the engagement and disengagement of the pawls 18a and 18b.

To carry out the lifting of a vessel of a pressurized-water nuclear reactor, four sets of pawls 18a and 18b and four jacks arranged at 90° relative to one another about the axis of the mast 13 have been used. Each of the jacks has a lifting force of 100 tons, so that the total lifting capacity is 400 tons.

The jacks have a stroke of 60 mm and the pitch of the toothing 13a of the mast 13 is 50 mm.

The progressive raising of the mast 13 and of the vessel 1 is carried out in complete safety by means of the pawls, with which are associated devices for monitoring the correct engagement of the pawls in the toothing 13a.

The lifting of the vessel is executed over a vertical distance corresponding to a particular number of displacement pitches of the rack, so as to provide above the level of the bottom of the pool for the internal equipment some wall height of the vessel 1, on which the cutting of blocks of material is carried out in a manner to be described below.

Figure 9:
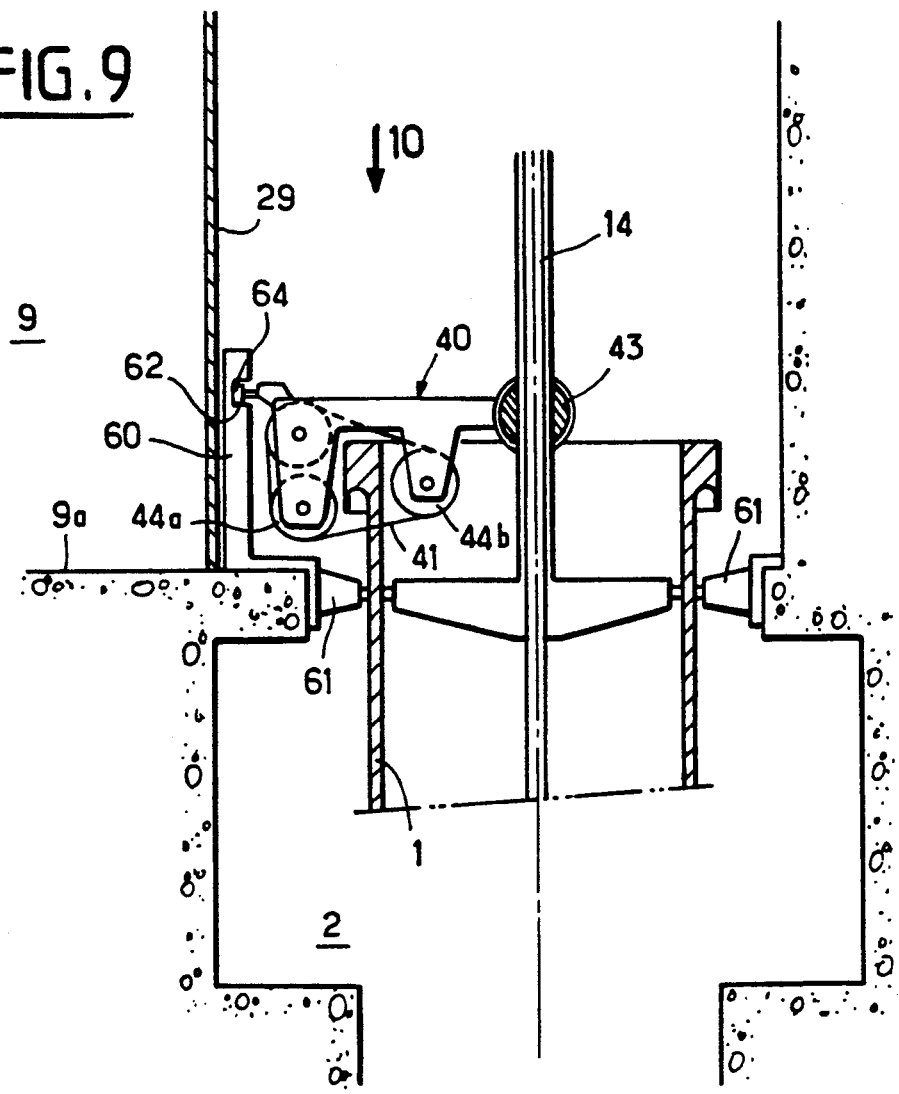
FIG. 9 is a sectional view in a vertical plane of means of the band-saw type for cutting the wall of the vessel in a substantially horizontal direction.
Figure 10:
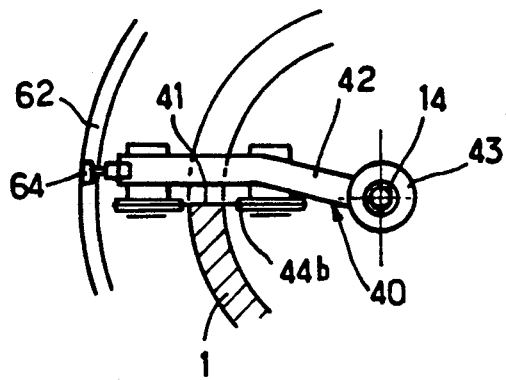
FIG. 10 is a top plan view in the direction of arrow 10 of FIG. 9.

FIGS. 9 and 10 illustrate in more detail the cutting machine 40 which consists of a band saw shown in FIG. 6.

The band 41 of the saw is mounted on pulleys 44a and 44b driven in rotation by a motor means.

The cutting of the wall of the vessel 1 is performed at a level located just above the level of the bottom 9a of the pool for the internal equipment.

A guiding and centering device 60 is placed on the upper rim of the vessel well 2, level with the bottom 9a of the storage pool 9 for the internal equipment.

The device 60 comprises bearing abutments 61 making it possible to carry out the centering of the vessel 1 and the alignment of its axis with the axis common to the well 2 and to the tubular structure 14, to which the cutting device 40 is fastened by means of the 43.

The guiding device 60 comprises a helical groove 62 the axis of which corresponds to the axis of the vessel well 2. The cutting machine 40 has a guide roller 64 which moves along within the groove 62 during the cutting of the vessel.

The groove 62 has an angular amplitude determining the rotational displacement of the saw blade 41 about the axis of the vessel, of the order of 30°. The support 42 of the cutting machine, which is mounted rotatably on the tubular structure 14 by means of the pivot bearing 43, is displaced in rotation about the axis of the tubular structure 14 coinciding with the axis of the vessel, so as to describe an angle of 30° about this axis, at the same time making a cut in part of the wall of the vessel 1 along a helix, the shape of which is homothetic with the helix formed by the guide groove 62. During this displacement, the support 42 of the cutting machine is also capable of pivoting in a vertical direction as a result of the construction of the bearing 43 in the form of a ball joint. The saw blade 41 taking the form of a band is driven in rotation by a drive motor.

After the wall of the vessel 1 has been cut along a cylindrical sector of an amplitude of 30° and along a helix the axis of which is the axis of the vessel, the cutting machine 40 is returned to its initial position, and the vessel is rotated oppositely to the cutting direction by means of the device, 21 for setting the mast 13 in rotation, while at the same time it is raised over a height corresponding to one displacement pitch of the mast 13, so as to return the cutting blade 41 to the end of the helical incision previously made.

A new cut of an amplitude of 30° and of helical shape is made in the wall of the vessel as a result of the rotational displacement of the cutting machine 40 about the axis of the vessel.

A cut of helical shape can thus be made over all or part of the periphery of the vessel by means of successive rotational displacements of the cutting machine 40 and translational and rotational displacements of the vessel 1.

The total height H of the segment of the wall cut in the course of a complete revolution of the cutting machine is equal to the displacement pitch P of the mast 13 multiplied by the number of rotational displacements of the machine in the direction in which cutting is being carried out. For a rotational displacement of the machine of 30°, the number of displacements in the course of one revolution is 12, hence $H=12P$ where the pitch P is 50 mm and the height H cut during each revolution is 600 mm.

Figure 13:
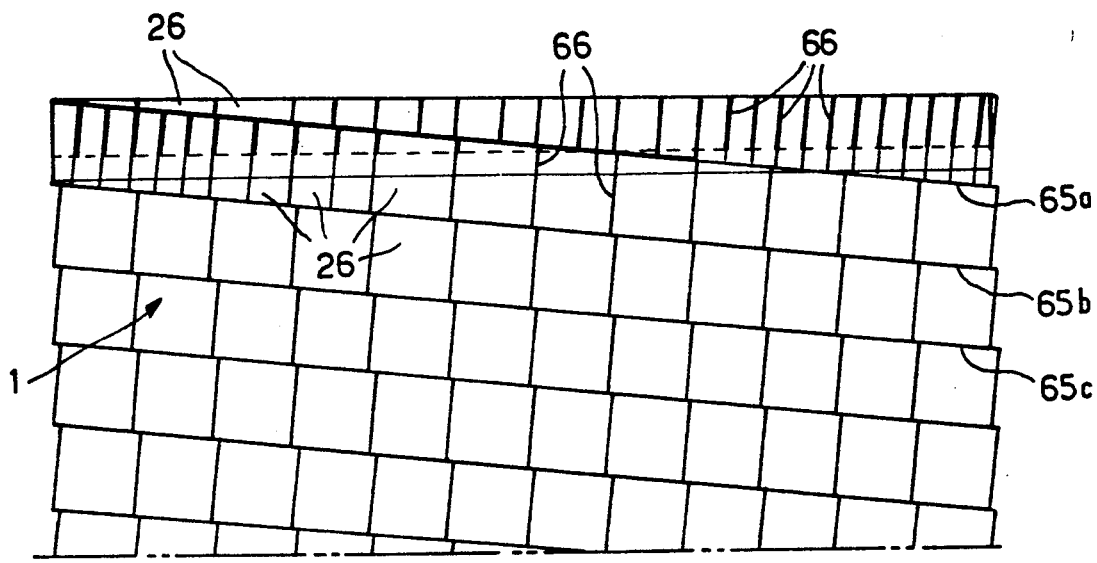
FIG. 13 is a developed view of the lateral wall of the vessel, showing the cutting lines of this wall, when the process according to the invention is put into practice by the use of devices, such as those illustrated in FIGS. 9 and 11.

FIG. 13 shows a developed view of the helical cuts 65a, 65b, 65c, slightly inclined relative to the horizontal plane, which are made in the wall of the vessel 1 by the cutting machine illustrated in FIGS. 9 and 10.

Figure 11:
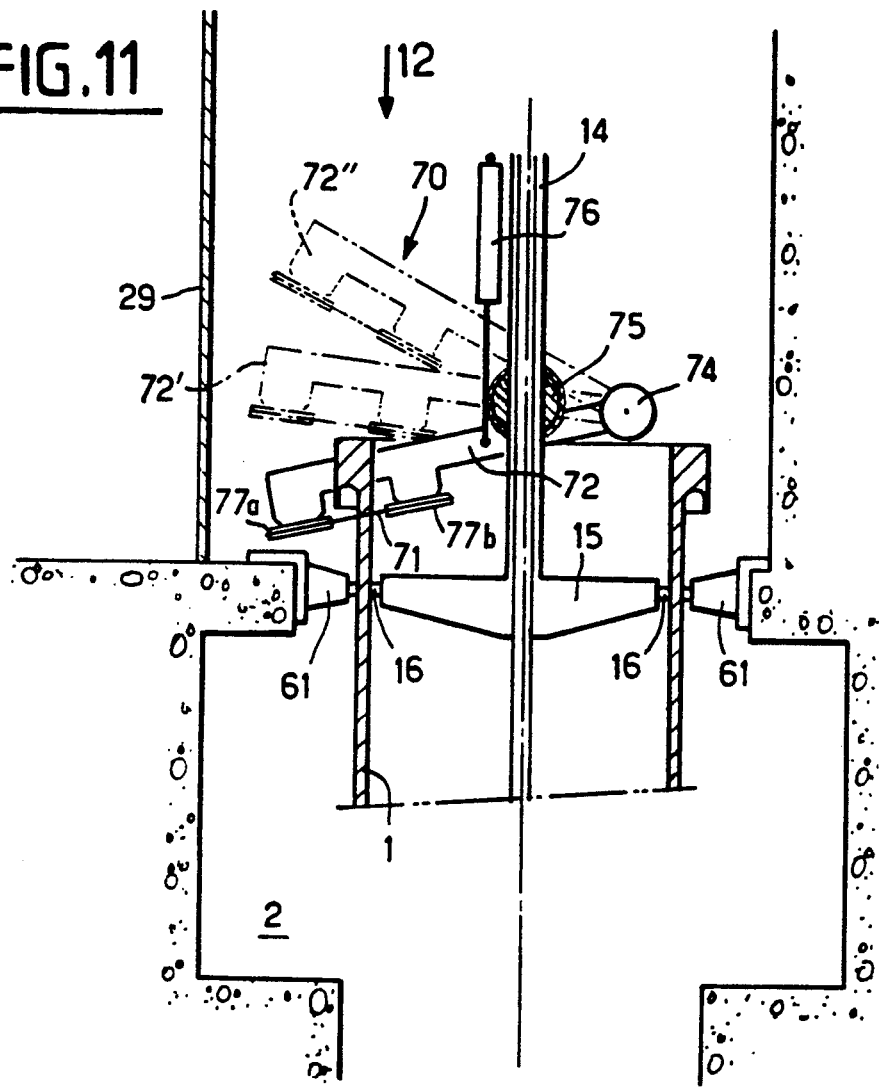
FIG. 11 is a sectional view in a vertical plane of means of the band-saw type for cutting the wall of the vessel in a substantially vertical direction.
Figure 12:
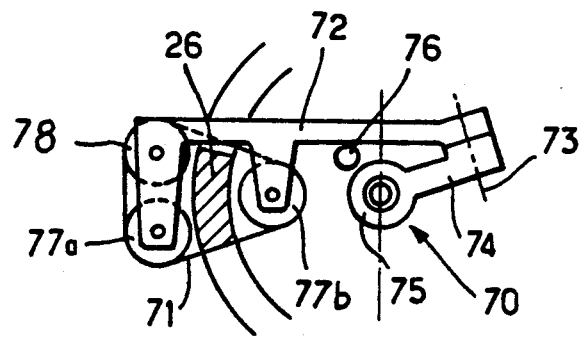
FIG. 12 is a top plan view in the direction of arrow 12 of FIG. 11.

FIGS. 11 and 12 show the cutting machine 70 allowing straight cuts to be made in a direction forming a small angle relative to the vertical, so as to execute a sectioning of the vessel wall, in which one or more cuts, such as the cuts 65a, 65b, 65c shown in FIG. 13, have been made in a substantially horizontal direction.

The cutting machine 70 illustrated in FIGS. 11 and 12 allows successive cuts 66 (FIG. 13) to be made in the wall of the vessel 1, in order to form blocks 26 of irradiated material which are delimited by the horizontal and vertical cuts.

As explained above, the blocks 26 are picked up by a hoist 24 which makes it possible to transport these blocks into a storage container 27 arranged in the pool for the internal equipment.

The machine 70 for cutting in the vertical direction comprises a support 72 mounted pivotably about a horizontal axis 73 on a second support 74 itself fixed to the rotating part 75 of a bearing mounted rotatably about the tubular structure 14.

An actuating jack 76, of which the body is fixed to the tubular structure 14 and the rod is connected to the support 72 of the cutting machine 70, makes it possible to pivot the support 72 about the axis 73.

FIG. 11 illustrates a first position, shown in solid lines, of the support 72 and two positions 72' and 72", shown in solid lines, which are obtained during the upward pivoting of the support 72 from its low position shown in solid lines.

The actual cutting tool consists of a band saw mounted on the lower part of the support 72.

The tensioning and driving of the band 71 of the saw are ensured by two pulleys 77a and 77b mounted loosely on the support 72, and by a driving pulley 78.

The pivoting axis 73 of the support 72 in relation to the support 74 can be inclined slightly relative to the horizontal plane, so that the pivoting of the support 72 and of the saw band 71 under the effect of the jack 76 takes place in a plane slightly inclined relative to the vertical. This provides cuts, such as the cuts 66, inclined slightly in relation to the vertical direction.

By rotating the support 72 about the axis of the vessel by means of the bearing 75, the cutting tool 70 can be placed in such successive positions that the band 71 executes the cutting of blocks 26 in the wall of the vessel 1, after horizontal cuts, such as the cuts 65a, 65b, 65c shown in FIG. 13, have been made.

The centering of the vessel 1 and the alignment of its axis with the axis of the tubular structure 14 are ensured by the centering arms 15 and the jacks 16 and by the external centering devices 61.

As can be seen in FIG. 13, the first cut 65a in the circumferential direction of the vessel, inclined slightly in relation to the horizontal plane, allows the horizontal cutting saw to penetrate into the metal of the vessel wall at a small angle and permits a progressive advance in the axial direction of the vessel.

The first ring of metal delimited by a helical cut is sectioned by the vertical cutting saw according to the cuts 66, in order to form a first series of blocks 26 which can be disposed of and stored in a container placed in the pool for the internal equipment.

The succeeding rings delimited by helical cuts and of substantially constant height are likewise sectioned by the vertical cutting saw, to form blocks 26 of substantially rectangular or square shape which are disposed of in sequence.

The dismantling of the vessel is effected by a successive execution of substantially horizontal cuts and of substantially vertical cuts delimiting blocks 26 which are disposed of in sequence.

During the cutting of the blocks for the purpose of dismantling of the vessel, the vessel can be filled with water up to a level below the part which is being cut or, if appropriate, can be empty of water. The water level in the vessel can be lowered during the progress of the cutting in the direction of the vessel bottom, before each operation of lifting the vessel between two successive series of cutting operations.

The cutting operations are conducted at a substantially constant level located slightly above the upper level of the vessel well.

This avoids the need to carry out the cutting on the inside of the vessel well and from the inner surface of the vessel, thus limiting the pollution of the concrete structures delimiting the vessel well by radioactive products.

Moreover, the tools used for cutting are more easily accessible and it likewise becomes easier to control and guide them.

FIGS. 14 and 15 and FIGS. 16 and 17 illustrate alternative embodiments of the horizontal cutting device and of the vertical cutting device making it possible to dismantle the vessel 1 by cutting blocks from the wall.

Figure 14:
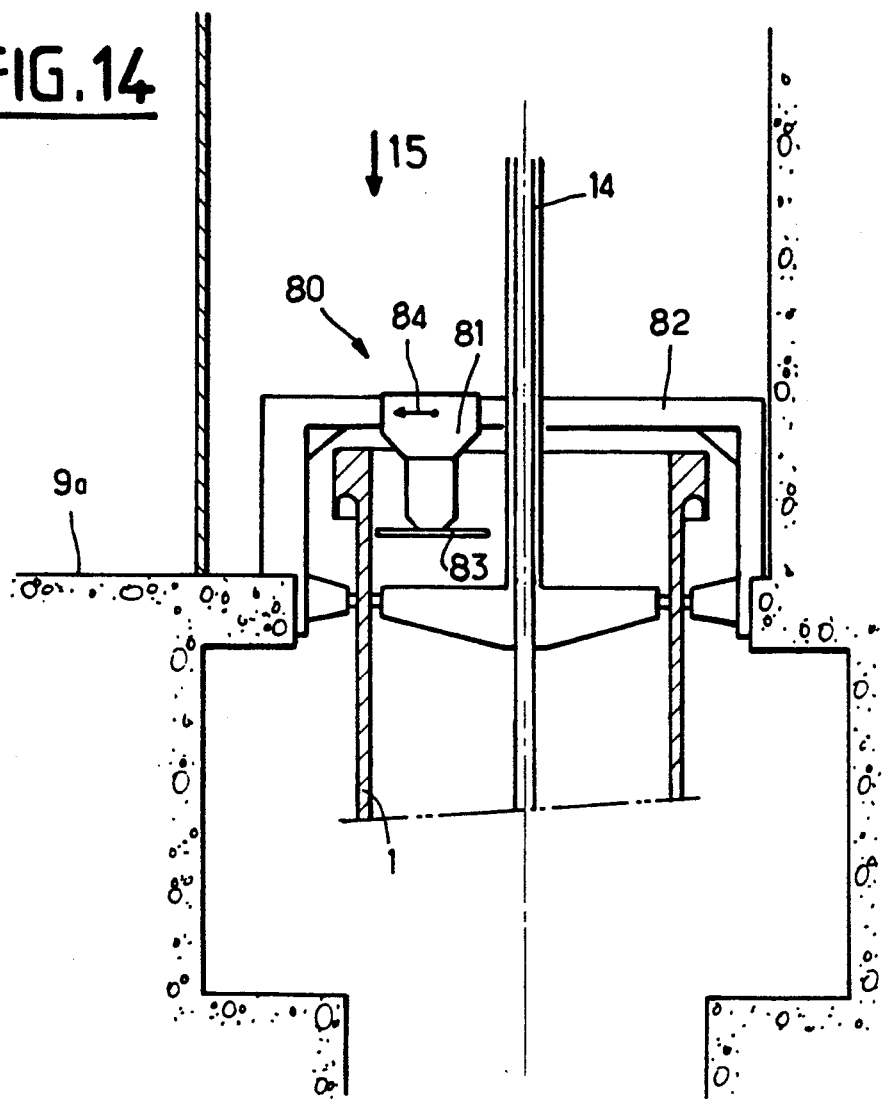
FIG. 14 is a sectional view in a vertical plane of means of the circular-saw type for cutting the wall of the vessel in a substantially horizontal direction.
Figure 15:
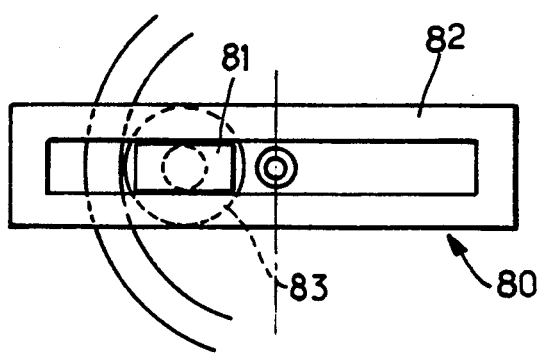
FIG. 15 is a top plan view in the direction of arrow 15 of FIG. 14.
Figure 16:
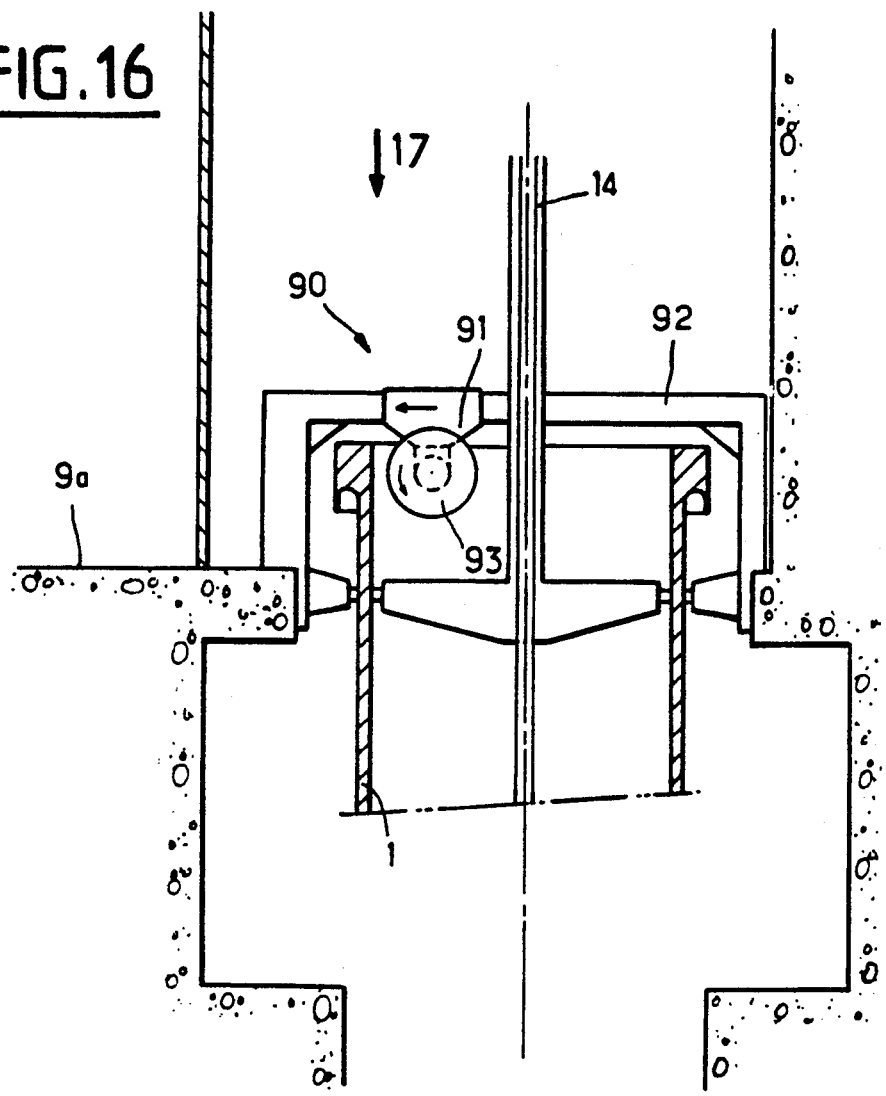
FIG. 16 is a sectional view in a vertical plane of means of the circular-saw type for cutting the wall of a vessel in a substantially vertical direction.
Figure 17:
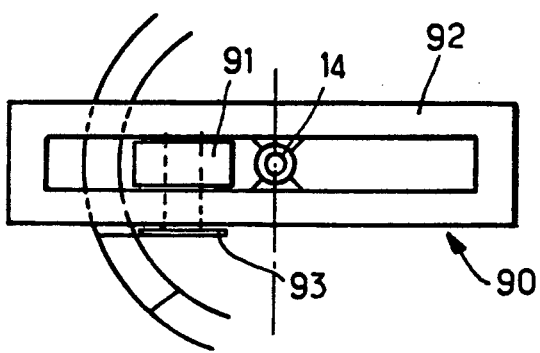
FIG. 17 is a top plan view in the direction of arrow 17 of FIG. 16.

The horizontal cutting device 80 illustrated in FIGS. 14 and 15 and the vertical cutting device 90 illustrated in FIGS. 16 and 17 consist of a respective circular saw 81 and 91 mounted movably in a radial direction in relation to the vessel 1, on a respective gantry 82 and 92 placed in a transverse direction above the vessel well.

Where the device 80 for cutting in a horizontal direction is concerned, the disk 83 of the circular saw 81 is placed in a horizontal plane and mounted rotatably about a vertical axis. The advancing movement of the circular saw 81 in the direction of the arrow 84 allows a horizontal cut to be made in the wall of the vessel 1 and over its entire thickness, slightly above the vessel well and the bottom 9a of the pool for the internal equipment.

If a cutting device comprising a circular saw is used, it is possible to make a perfectly horizontal cut, the penetration into the metal of the vessel wall being effected from inside the vessel and in a cross-sectional plane thereof.

The circular saw for vertical cutting 91 comprises a saw disk 93 arranged in a vertical plane and mounted rotatably about a horizontal axis.

The penetration into the metal of the vessel wall is effected from inside the vessel and in an axial plane. The cuts can be perfectly vertical and perpendicular to the horizontal cuts made previously. This provides blocks 26 of irradiated material of rectangular or square shape, delimited by the horizontal cuts and the vertical cuts.

The cutting of the vessel wall is executed by rotating the vessel through a particular angle between two cutting operations involving successively the device 80 for cutting in the horizontal direction and the device 90 for cutting in the vertical direction.

The cutting tools are controlled remotely, and the cutting operations are in all cases carried out in a zone making it possible to avoid major contamination of the reactor structures by radioactive products.

Figure 18:
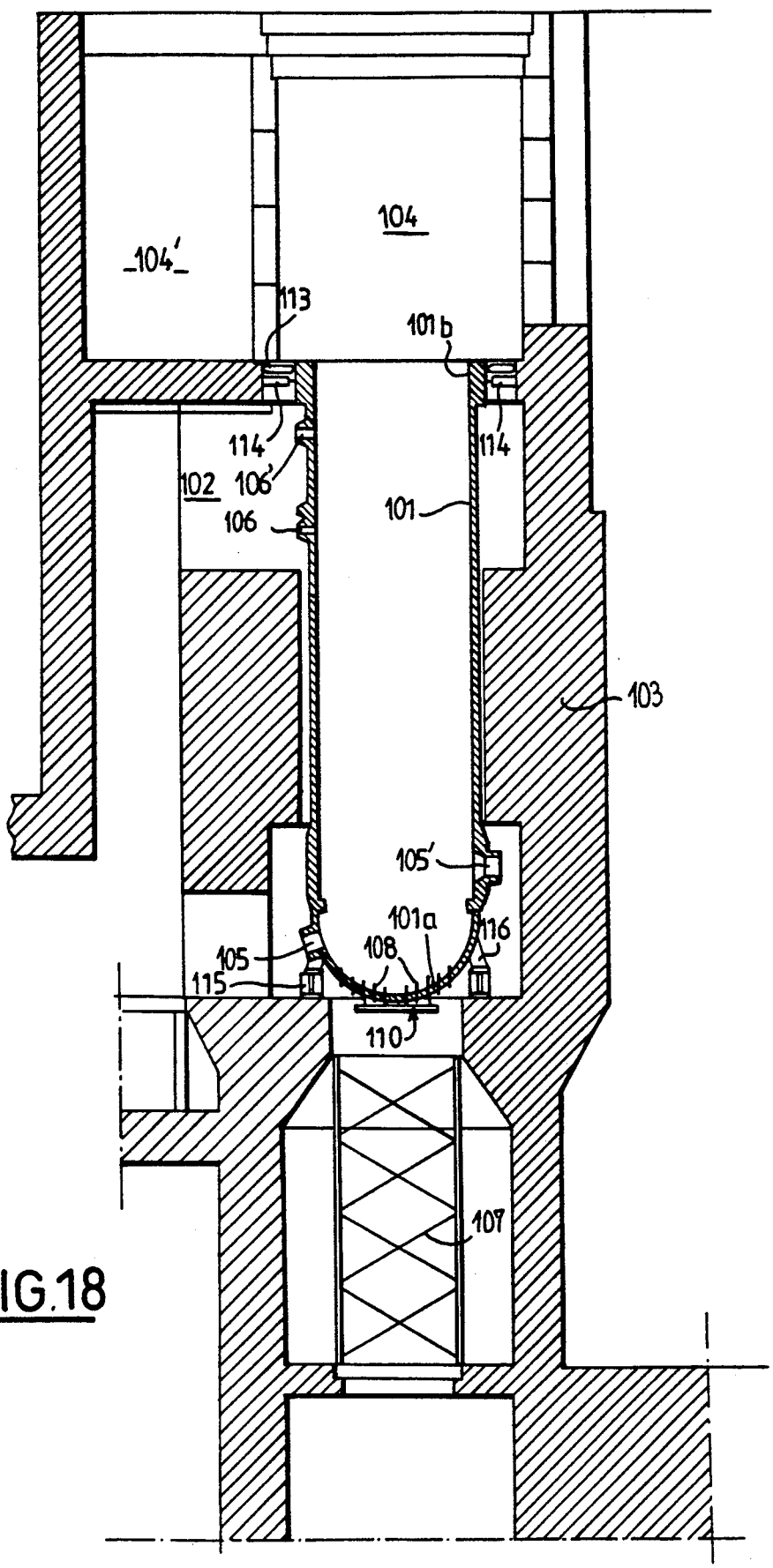

FIG. 18 shows a vessel 101 of a water-cooled nuclear reactor during a preparatory phase prior to its dismantling.

The vessel 101 is arranged inside a vessel well 102 within the concrete structure 103 of the nuclear reactor.

The vessel well 102 opens out in its upper part into the pool 104 of the reactor.

To dismantle the components of the reactor and particularly the vessel 101, the reactor is cooled after its permanent shutdown and the pool 104 is filled with water.

The cover of the vessel is then dismounted and the core assemblies and of the internal equipment arranged in the vessel are unloaded underwater. The pool of the reactor is subsequently emptied and the vessel decontaminated, for example by the circulation of a chemical reagent in contact with its inner surface.

The vessel is emptied and a device for the containment of the vessel well is installed.

A scaffolding 107 is erected in the extension of the vessel well, underneath the hemispherical vessel bottom 101a.

Cutting tool equipment is introduced into the vessel well so as to carry out the cutting of the pipework connecting the vessel to the reactor circuit, in the region of the connection pieces 105, 105' and 106, 106'. The cutting of the guide tubes or instrumentation tubes 108 passing through the bottom 101a of the vessel is also executed. This operation is conducted from the upper part of the scaffolding 107.

A support 110, which can be seen particularly in FIG. 19, is put in place under the bottom 1a of the vessel.

The support 110 comprises a bearing plate 10a which is fastened under the vessel bottom by means of rods 111 engaged in guide tubes or instrumentation tubes passing through the vessel bottom 101a, depending on the type of nuclear-reactor vessel for which the dismantling process according to the invention is used.

The rods 111 have a threaded end which is engaged into an orifice passing through the plate 110a and onto which a nut is screwed. The nuts screwed onto the threaded end parts of the rods 111 make it possible to ensure the fastening of the plate 110a which carries abutments 112 coming to bear on the vessel bottom 101a during the tightening of the nuts.

Before the displacement of the vessel 101 in successive steps in the vertical direction is executed to allow it to be cut in a zone located in the vicinity of the upper part of the vessel well 102, on the inside of the reactor pool 104, there are installed around the upper part of the vessel 101 an inflatable gasket 113 for closing the upper part of the vessel well 102 and guide jacks 114 for centering and guidance of the vessel 101 during its displacements in the vertical direction.

Likewise installed in the pool 104 and in a room 104' arranged laterally of pool 4 are cutting and handling means which can be similar to the means described above and which enable cutting of blocks from the wall of the vessel 101 and the disposal of the cut blocks in storage containers.

The reactor vessel 101, for which the dismantling process according to the invention is used, rests by means of supporting feet 116 on a supporting ring 115 fastened to the concrete structure 103 of the reactor at the upper level of the vessel well 102.

Figure 21:
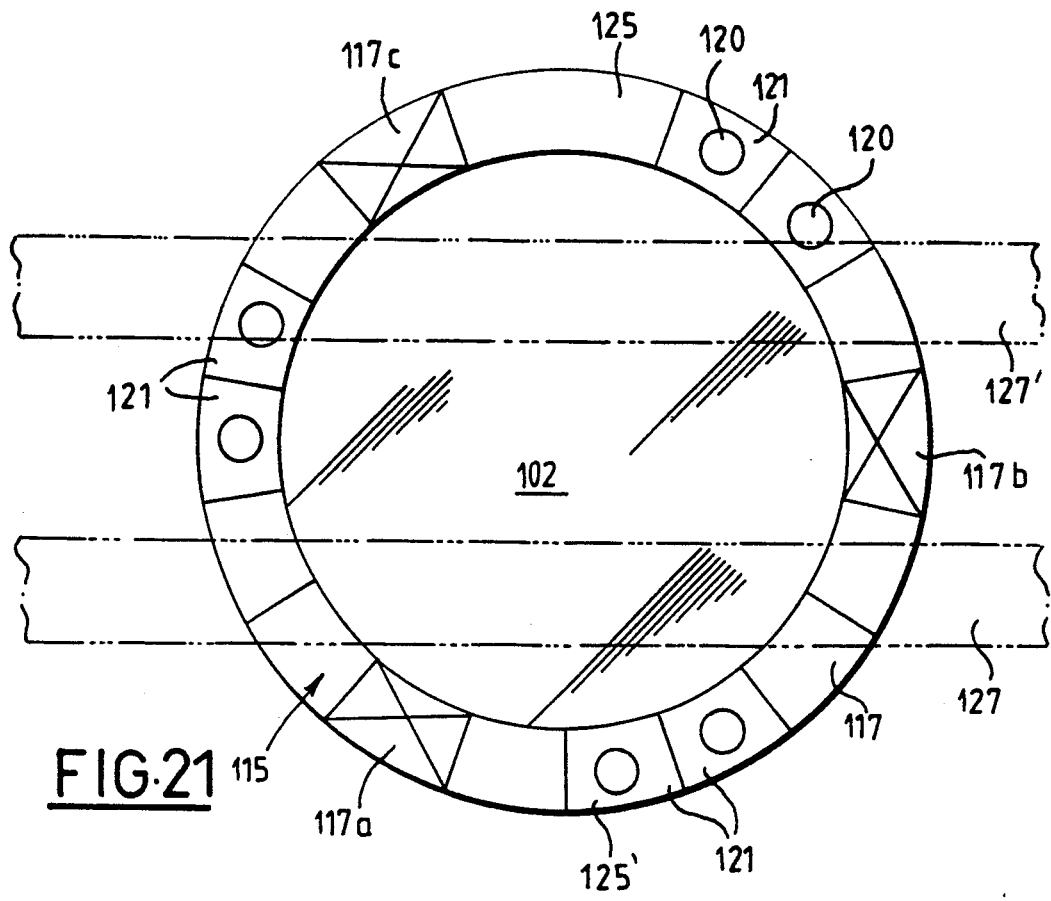

In FIG. 21, the supporting ring 115 has been shown in a plan view, the upper surface of the ring 115 comprising eighteen successive zones 117 in the circumferential direction, the angular amplitude of each of these zones being 20°. Fifteen zones 117 are intended for receiving bearing surface of a supporting foot 116 of the vessel 101.

The three remaining zones 117a, 117b and 117c, which are arranged vertically in line with the connection pieces joining the vessel to the reactor circuit, such as the connection pieces 105 and 105', do not receive supporting feet of the vessel 101 coming to bear on the ring 115.

As can be seen in FIGS. 19 and 20, an initial lifting of the vessel can be carried out by means of jacks 120 which are interposed between the supporting ring 115 and some of the supporting feet 116.

The jacks 120 are arranged within cutouts 121 of the supporting ring 115 and are brought to bear on wedging pieces 122.

The height of the cutouts 121 is sufficient to ensure that a jack 120 bearing on the wedges 122 can be placed underneath a supporting foot 116 at the initial moment of prior lifting of the vessel 101.

As can be seen in FIG. 21, the cutouts 121 are made in three zones distributed at 120° around the ring 115 and corresponding to two successive zones 117 allowing the bearing of a supporting foot 116.

Three sets of two jacks 120 are placed in the cutouts 121, each made in two successive zones 117 of the ring 115.

The vessel is lifted in passes by the simultaneous action of three jacks 120, each arranged in one of the three cutouts 121 distributed over the periphery of the vessel.

After the vessel has been lifted over the height of a pass by the use of three jacks each located in a cutout 121, a wedging piece of a height corresponding to the height of the pass is placed underneath each of the jacks which have not been used for the lifting and which are arranged in the vicinity of the jacks which have executed the lifting, in the same cutout 121 of the ring 115.

The next lifting pass is executed by using the jacks, the wedging of which has just been carried out, thus making it possible to raise the vessel an additional step. The wedging of the first set of three jacks which executed the lifting of the vessel is then carried out.

This ensures the lifting of the vessel in successive passes by the placing of the wedging elements 23 (see FIG. 20) under each of the jacks 120.

During the successive steps of the lifting of the vessel, wedging pieces are placed under all or some of the supporting feet 116 of the vessel which are not being used for lifting of the vessel as a result of interaction with a jack 120.

At the end of the operation for the initial lifting of the vessel, there are placed underneath the supporting feet, in two zones 125 and 125', wedging pieces of sufficient height to maintain the vessel in the high position reached at the end of the initial lifting.

The supporting ring 115 of the vessel is then cut in four zones aligned two by two to allow the passage of two parallel sections or girders 127, 127' intended for constituting part of the stationary support of the vessel during its subsequent displacement in successive steps in the vertical direction.

The sections 127, 127' have the same height as the ring 115 and come to rest on the concrete structure 103 of the reactor in a lateral orifice 131, as can be seen in FIG. 19. The wedging pieces 128 make it possible to ensure good stability of the sections 127 and 127' which, together with the ring 115, constitute a stationary support on which the vessel rests during its lifting in successive steps and its cutting.

Figure 23:
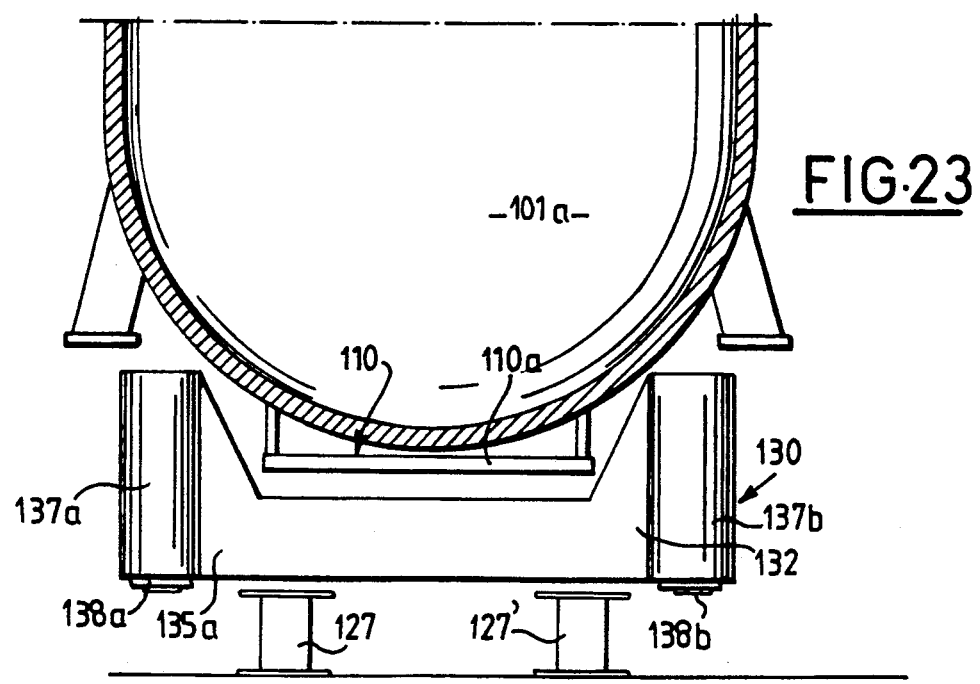
Figure 22:
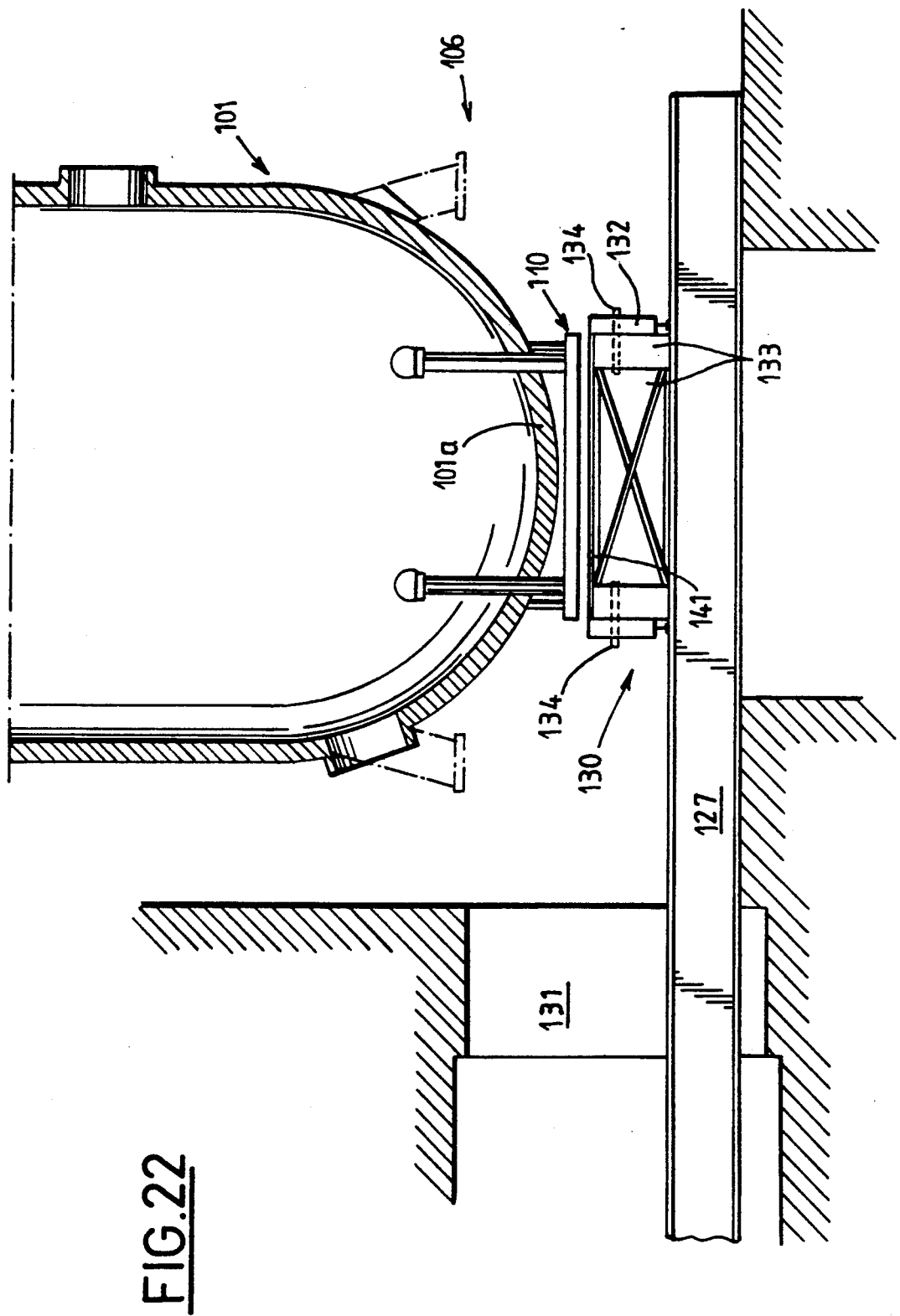

As can be seen in FIGS. 22 and 23, at the end of the operation for the initial lifting of the vessel by the use of the jacks 120 and the wedging pieces 123, the vessel bottom 101a and the support 110 are at a particular height above the upper surface of the stationary support consisting of the ring 115 and of the sections 127.

The vertical spacing present between the upper surface of the sections 127 and the lower bearing surface of the support 110 makes it possible to introduce between these elements a lifting module 130 which will be described below.

The lifting module 130 is introduced through the lateral orifice 131 made in the concrete structure of the reactor, at a level located in the vicinity of the vessel bottom 101a.

The rails 127 and 127' are arranged over the length of the orifice 131 and form a transfer track for the modular lifting element 130 when it is being put in place underneath the support 110 fixed bottom 101a.

The lifting element 130, which will now be described with reference to FIGS. 22, 23 and 24, comprises a raising device 132 and a modular supporting element 133 which are assembled together by means of keys 134.

The raising device 132 takes the form of a frame comprising two parallel uprights 135a and 135b assembled together by means of spacers 136. The uprights and the spacers consist of metal plates assembled by welding.

Fastened to the ends of the uprights 135a and 135b are jack boxes, such as 137a and 137b, inside each of which is placed a hydraulic jack, the body of which bears on the bottom of the corresponding jack box.

Figure 24:
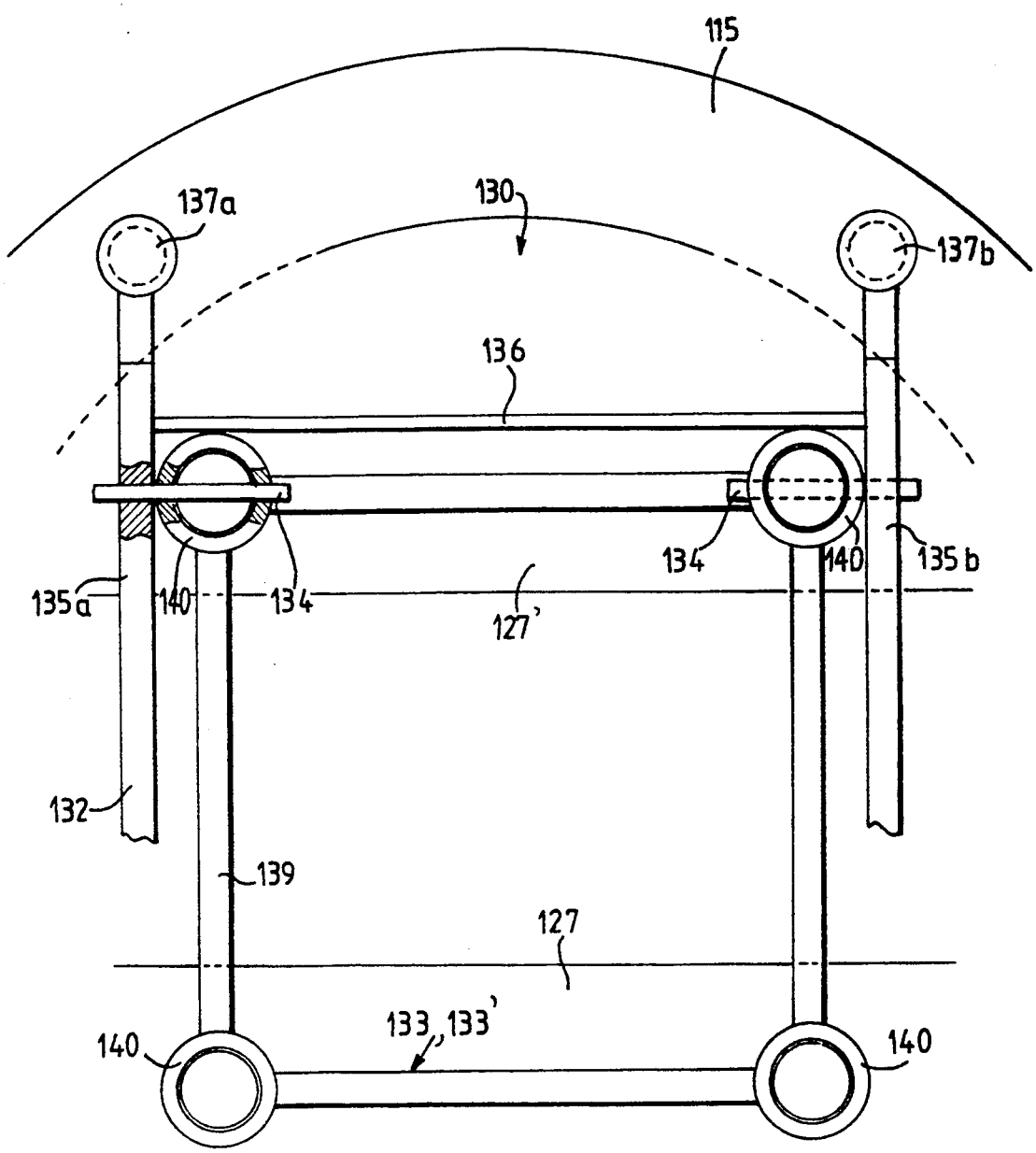

As can be seen in FIG. 24, when the lifting element 130 is in vertical alignment with the vessel bottom 101a, as shown in FIGS. 22 and 23, the jack boxes 137a and 137b the raising device 132 are vertical alignment with the supporting ring 115.

The rods of jacks 138a and 138b (FIG. 23) arranged inside the jack boxes 137a and 137b come to bear on the upper surface of the supporting ring 115.

By feeding the jacks, such as 138a and 138b, of the raising device 132 in the direction bringing about the extension of the jack rods, the frame of the device 132 is raised in a direction perpendicular to the frame by means of the jack body coming to bear on the bottom walls of the corresponding jack boxes.

By means of the frame of the raising device 132, the modular supporting element 133 fastened to the frame of the raising device 132 by means of the keys 134 is raised.

The modular supporting element 133 takes the form of a frame of square cross-section, the faces 139 of which are connected at each of their ends to columns 140 in the region of the corners of the frame.

The columns 140 are diametrically penetrated by orifices allowing the passage of the assembly keys 134 and having male or female frustoconical ends allowing a stable stacking of identical modular elements.

The dimensions of the modular supporting element 133 are such that this modular element can come into place within the frame of the raising device 132 delimited by the uprights 135a and 135b and the spacers 136.

In FIG. 24, the raising device 132 and the modular supporting element 133 are shown in their assembly position, the uprights 135a and 135b having through-orifices in alignment with the orifices of the columns 140 of the modular supporting element 133. In this position, the keys 134 can be introduced into the aligned orifices of the uprights 135a and 135b and of the columns 140.

The columns 140 of the modular element 133 are arranged vertically in line with the supporting sections 127 and 127' when the lifting module 130 is in its operating position beneath the vessel bottom 101a.

Feeding the jacks, such as 138a and 138b of the raising device 132 causes, by the extraction of the jack rods, the frame of the 132 and of the modular supporting element 133 which is fastened thereto to to be raised.

The upper part of the modular supporting element 133 taking the form of a turntable 141 (see FIG. 22) comes into contact with the lower surface of the plate 110a of the support 110 fixed to the vessel bottom 101a.

The vessel 1 resting by means of the support 110 on the modular supporting element 133 can thereby be raised over a particular height corresponding to the amount of vertical displacement of the raising device 132.

Figure 25:
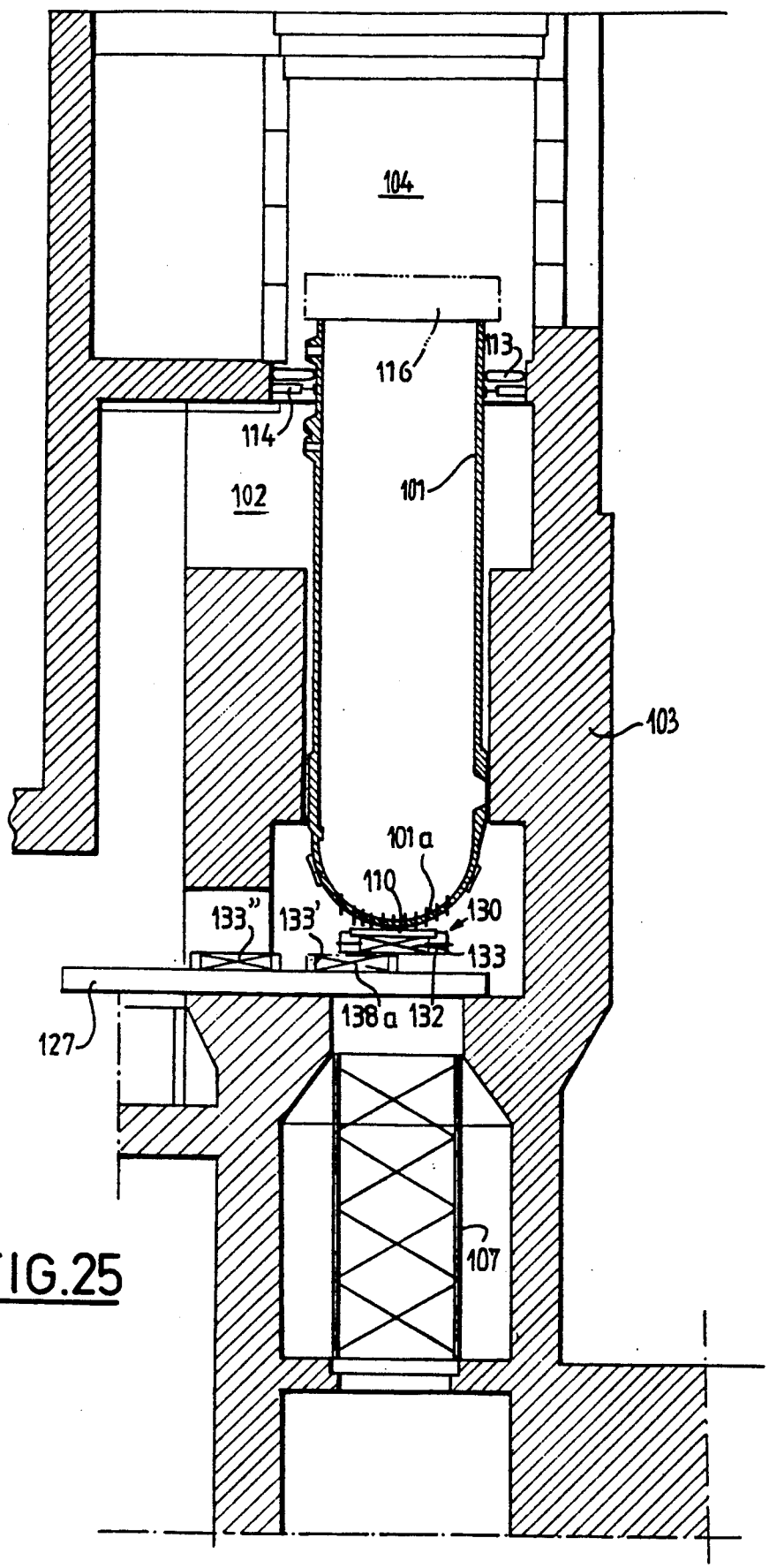

As can be seen in FIG. 25, when the lifting element 130 is in the high position, obtained as a result of the extension of the jacks, such as 138a and 138b, a second modular supporting element 133' identical to the element 133 can be introduced underneath the element 133 raised by the device 132.

The element 133 is displaced by transfer along the track consisting of the sections 127 and 127'. The amount of raising of the device 132 corresponds to the height of a modular lifting element, such as 133 or 133', plus a clearance allowing the passage of the element 133' underneath the frame of the device 132 and the modular supporting element 133 fastened within the frame of the device 132.

The device 133' is arranged so as to be in exact vertical alignment with the modular element 133.

The jacks, such as 138a and 138b of the raising device 132, are fed oppositely to the raising direction, in such a way that the element 133 comes to rest on the element 133', itself bearing on the sections 127 and 127', by means of frustoconical bearing surfaces of the columns 140.

The assembly keys 134 making the connection between the frame of the raising device 132 and the modular supporting element 133 are then removed.

The descending movement of the device 132 is then continued by feeding the jacks in the desired direction, up to the moment when the frame of the device 132 has returned to its initial position. The modular supporting element 133' is then in the position of the modular element 133 shown in FIG. 24.

The modular supporting element 133' and the raising device 132 can be assembled by introducing keys 134 into the aligned orifices of the uprights of the device 132 and of the columns of the modular supporting element 133'.

A lifting element identical to the lifting element 130 and consisting of the raising device 132 to which the modular supporting element 133' is fastened is then placed underneath the modular supporting element 133 on which the vessel rests by means of the support 110.

The vessel 101 is raised inside the well 102, in such a way that its upper part, consisting particularly of the vessel flange 101b, can be cut on the inside of the reactor pool 104 and in the vicinity of the upper part of the vessel well 102.

It should be noted that, during the cutting at the end of the vertical displacement of the vessel by the agency of the raising device 132, the vessel 101, while it is being raised, rests by means of its bottom 101a, the support 110 and the modular supporting elements 133 and 133' on the rails 127 and 127' constituting elements of the stationary support of the vessel 101.

The vessel 101 is therefore not suspended inside the vessel well 102 but rests, during the cutting operations, by means of its bottom on supporting elements bearing on the fixed structure of the reactor.

The operations of cutting and handling the blocks cut from the wall of the vessel 101 can be conducted in the way described above.

At the end of the cutting operation conducted on the part of the vessel located above the upper level of the vessel well after the vertical displacement of the vessel by means of the displacement device 132, the latter can execute a new vertical displacement of the vessel 101 which rests on the element 133', assembled together with the frame of the raising device 132, by means of the support 110 and the modular element 133.

The vessel is raised by an amount slightly greater than the height of a modular supporting element, such as 133 and 133'.

A third modular supporting element 133" identical to the modular supporting elements 133 and 133' is displaced by shifting on the sections 127 and 127' and is vertically aligned with the element 133' fixed to the frame of the raising device 132 and placed in the high position by this raising device.

The jacks of the raising device 132 are subsequently fed oppositely to the raising direction, in such a way as to bring the element 133', on which the vessel rests by means of the element 133 and the support 110, to rest on the modular supporting element 133".

The vessel 101 is now in a new lifting position in the vertical direction which allows a new segment of the vessel wall to be cut on the inside of the pool 104 above the upper level of the vessel well 102.

The cutting of the vessel wall is thus executed in successive segments after each of the unit lifts of the vessel making it possible to place a new modular supporting element underneath the element, which is raised of the device 132, and to bring the vessel to rest, by means of the stacked modular elements, on this new element resting on the stationary support of the vessel formed by the rails 127.

Figure 26:
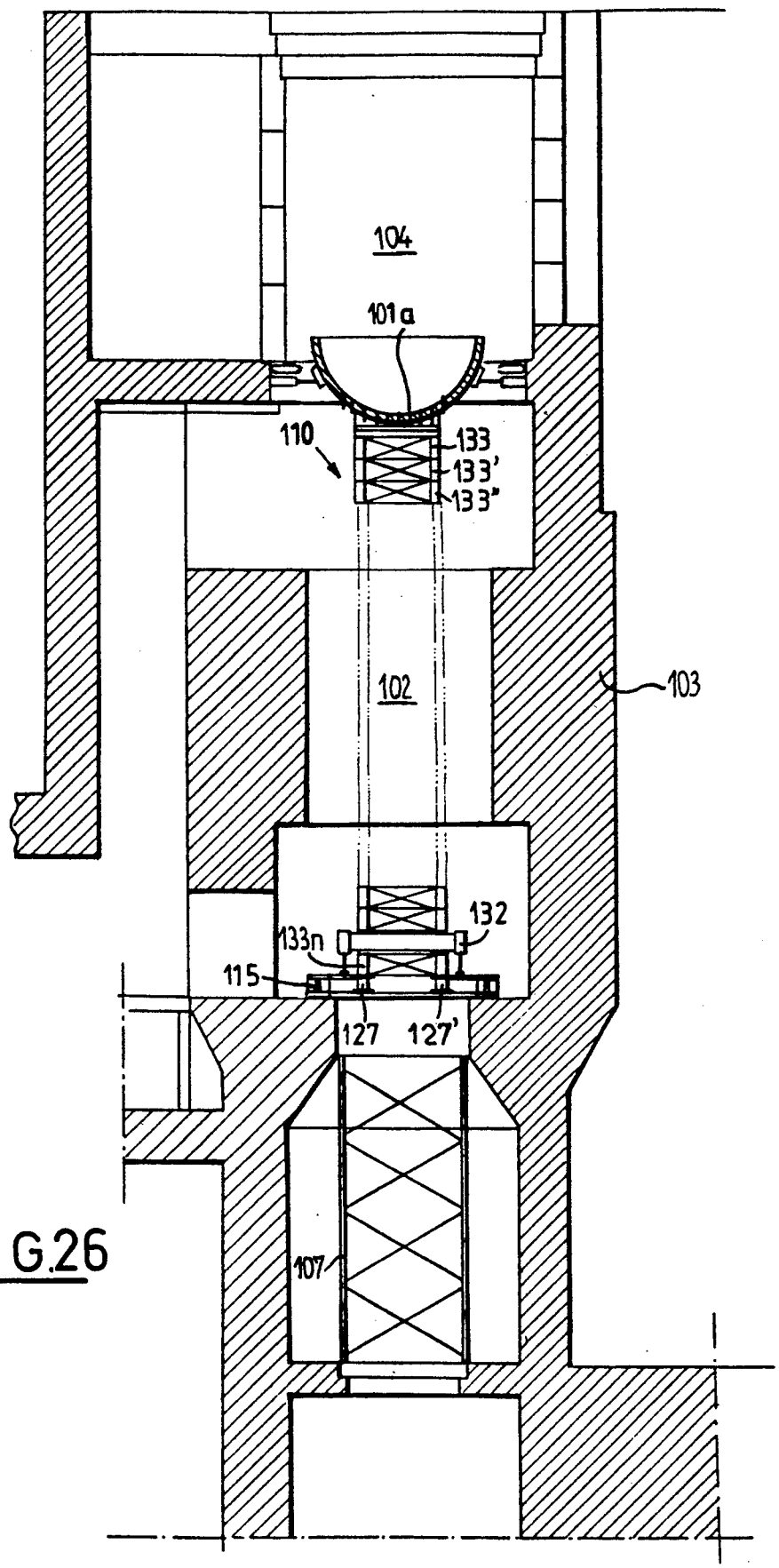

As can be seen in FIG. 26, the raising of the vessel in successive steps makes it possible to execute its cutting as far as the level of the domed bottom 101a.

Successive supporting elements 133, 133', 133", . . . 133n have been interposed between the support 110 fixed to the vessel bottom and the stationary support of the vessel formed by the rails 127 and 127'.

It is thus also possible to cut of the vessel bottom 101a in the vicinity of the upper level of the vessel well 102 by the use of a specially adapted cutting tool outfit.

It has been possible to execute the cutting of the vessel in the course of successive operations, during each of which the vessel rests, by means of a stack of modular supporting elements, on a stationary structure, itself bearing on the vessel bottom.

The successive lifts of the vessel are of identical amount and are obtained from the same raising device which interacts successively with each of the modular supporting elements bearing on the stationary support.

The process and apparatus according to the embodiment just described make it possible to obtain a vertical displacement of the vessel in successive steps, simply and in such a way that the vessel has a stable bearing during each of the cutting operations following a displacement in the vertical direction.

The lifting of the vessel can be executed by a pull or a push on the vessel bottom by the use of means different from those described.

Where the vessel is lifted by a push on the bottom the initial displacement of the vessel in the vertical direction, making it possible to install the lifting element underneath the vessel bottom, can be effected by any means allowing the vessel to be raised by a push on its lower part.

The raising device and the modular supporting element of the lifting unit employed for executing a unit lift of the vessel can have forms and structures different from those described.

The push on the lower bottom of the vessel or, more generally, of the component being dismantled can be exerted by means of an intermediate support, as described, or directly on one or more push surfaces formed on the lower part of the component.

The tools for cutting sections of irradiated material from the wall of the vessel can be different from a band saw or a circular saw. These cutting means can be non-mechanical, for example, an oxygen cutting torch, although thermal cutting processes give rise to the formation of vapor and of fine particles containing radioactive products, the trapping and filtration of which can be difficult to carry out.

The cutting tools can comprise means for displacement and guidance over a complete revolution about the axis of the vessel. In this case, the dismantling of the vessel can be executed without the need to rotate the vessel about its axis.

The disposal and storage of the sections of irradiated material can be carried out by means different from those described. The sections disposed of can be processed on the site of the reactor before their storage at a deactivation site or, on the contrary, transported to a processing factory and conditioned there for long-term storage.

The cutting of the domed bottom of the vessel can be carried out by using the tools for cutting the cylindrical wall of the vessel as a result of accessory means for handling the domed bottom or, on the contrary, by using special tool outfits.

Finally, the process according to the invention can be used for dismantling the vessel of any water-cooled nuclear reactor of the PWR or BWR type or for dismantling the internal equipment of such vessels.

More generally, the process according to the invention can be used for carrying out the dismantling of any irradiated component of a nuclear reactor comprising at least one part of tubular shape arranged with its axis vertical.

We claim:

1. A process for dismantling an irradiated component of a nuclear reactor, said component comprising at least one tubular wall arranged with its axis in a vertical direction, connected by connecting elements and fastened inside a well made in a concrete structure, said process comprising the steps of:
    (a) severing connecting elements between said concrete structure and said component;
    (b) vertically displacing said component in successive steps along its axis on an inside of said well;
    (c) cutting said wall of said component over a height corresponding substantially to a distance of vertical displacement, so as to obtain blocks of irradiated material of said wall, at an upper level of said well after displacement of said component;
    (d) disposing of the cut blocks for elimination or storage; and
    (e) cutting said component in successive steps separated by a displacement in the vertical direction.

2. Process according to claim 1, wherein cutting of said wall of said component to obtain blocks of irradiated material is carried out by a cutout in a substantially horizontal direction followed by cutouts in a substantially vertical direction.

3. Process according to claim 2, wherein a cut in a substantially horizontal direction is made along a slightly inclined helix having an axis coincident with the axis of said component, and is followed by a cutting operation in a direction slightly inclined to the vertical.

4. Process according to claim 2, wherein the cut in a substantially horizontal direction is made in a cross-sectional plane of said component and is followed by cutting operations in the vertical direction.

5. Process according to claim 1, wherein said component is rotated about its axis at the end of some cutting operations.

6. Process according to claim 1, wherein vertical displacement of said component comprises the successive steps of
    (a) positioning first means for raising said component under a lower part of said component and so as to bear on a stationary support resting on said concrete structure in the vicinity of the bottom of said vessel well;
    (b) lifting said component by a push of said first raising means on said lower part of said component;
    (c) introducing a first modular supporting element between said lower part of said component and said stationary support on which the modular element comes to bear;
    (d) actuating said first raising means in a direction opposite to the lifting direction, in order to bring said lower part of said component to bear on said first modular element; and, for each subsequent successive displacement step of said component:
    (e) executing a unit lift of said component over a specific vertical distance by second raising means bearing on said stationary support, in engagement with a modular supporting element interposed between said component and said stationary support and resting on said stationary support before the unit lift of said component;
    (f) introducing a modular supporting element, the height of which is smaller than the vertical distance of unit lift of said component, between said modular element with which said second raising means interact and said stationary support; and (g) actuating said second raising means in a direction opposite to the lifting direction, in order to bring said component to bear on said stationary support by means of the superposed modular elements.

7. Process according to claim 6, wherein said component is a nuclear-reactor vessel resting, by means of supporting feet fastened to a vessel bottom, on a supporting ring resting on said concrete structure of said reactor, and comprising the steps of:

(a) cutting cutouts in said supporting ring vertically in line with at least some of said supporting feet;

(b) arranging a lifting jack in each of said cutouts made vertically in line with a supporting foot;

(c) raising said vessel over a specific vertical lifting distance by use of some of said jacks coming to bear on corresponding supporting feet, and, after lifting of said vessel has been carried out, placing wedging pieces under those of said jacks which have not been used for lifting, so as to bring said jacks to bear on corresponding supporting feet; and (d) lifting said vessel by successive passes comprising lifting by some of said jacks and wedging of jacks not used for lifting.

8. Process according to claim 7, comprising cutting said supporting ring in order to provide cutout zones aligned two by two, and introducing into said aligned cutout zones at least two sections resting on said fixed concrete structure of said reactor and intended for forming part of said stationary support vertically aligned with said bottom of said vessel and a transfer track for bringing said modular supporting elements vertically into alignment with said bottom of said vessel.

9. Process according to claim 8, wherein said second raising means bear on said supporting ring for the purpose of executing a unit lift of said vessel.

10. Process according to claim 6, where, prior to the unit lift of said vessel, said second raising means are assembled, by means of removable assembly elements, together with said modular supporting element resting on said stationary support before the unit lift of said component.

11. Process according to any one of claims 6 to 10, comprising fastening to said lower part of said component a support, by means of which said lower part of said component is brought to bear on said modular supporting elements.

* * * * *